(12) United States Patent
Cha et al.

(10) Patent No.: US 9,547,391 B2
(45) Date of Patent: Jan. 17, 2017

(54) METHOD FOR PROCESSING INPUT AND ELECTRONIC DEVICE THEREOF

(71) Applicant: Samsung Electronics Co., Ltd., Gyeonggi-do (KR)

(72) Inventors: Hye-Jin Cha, Gyeonggi-do (KR); Won-Bae Lim, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 7 days.

(21) Appl. No.: 14/306,584

(22) Filed: Jun. 17, 2014

(65) Prior Publication Data

US 2015/0022468 A1 Jan. 22, 2015

(30) Foreign Application Priority Data

Jul. 16, 2013 (KR) .......................... 10-2013-0083479

(51) Int. Cl.
  *G06F 3/041* (2006.01)
  *G06F 3/0488* (2013.01)
  *G06F 3/0354* (2013.01)

(52) U.S. Cl.
  CPC ......... *G06F 3/0416* (2013.01); *G06F 3/03545* (2013.01); *G06F 3/04883* (2013.01)

(58) Field of Classification Search
  None
  See application file for complete search history.

(56) References Cited

U.S. PATENT DOCUMENTS

| | | | |
|---|---|---|---|
| 6,707,942 B1 * | 3/2004 | Cortopassi | G06K 9/00429 345/179 |
| 9,035,953 B1 * | 5/2015 | Kukulski | G06T 11/203 345/443 |
| 2002/0113779 A1 * | 8/2002 | Itoh | G06F 3/0414 345/173 |
| 2011/0063248 A1 * | 3/2011 | Yoon | G06F 3/0485 345/174 |
| 2012/0139863 A1 * | 6/2012 | Lee | G06F 3/0488 345/173 |
| 2013/0050141 A1 * | 2/2013 | Park | G06F 3/0488 345/174 |

FOREIGN PATENT DOCUMENTS

KR 10-2014-0025869 A 3/2014

* cited by examiner

*Primary Examiner* — Seokyun Moon
(74) *Attorney, Agent, or Firm* — Cha & Reiter, LLC.

(57) ABSTRACT

An operation method and an electronic device thereof is provided. The electronic device includes a touchscreen, and a controller. A pressure of a touch input made to the touchscreen of the electronic device is detected. A crop mode is set based on an association between the crop mode and the pressure. A crop boundary is designated by the touch input according to the set crop mode.

16 Claims, 17 Drawing Sheets

METHOD FOR PROCESSING INPUT AND ELECTRONIC DEVICE THEREOF

CROSS REFERENCE TO RELATED APPLICATION

This application claims priority under 35 U.S.C. §119(a) to a Korean Patent Application filed in the Korean Intellectual Property Office on Jul. 16, 2013 and assigned Serial No. 10-2013-0083479, the contents of which are herein incorporated by reference.

TECHNICAL FIELD

The disclosure relates to an electronic device. More particularly, the disclosure relates to a method for processing an input in an electronic device and the electronic device thereof.

BACKGROUND

With the growth of mobile communication technologies, electronic devices have become essential communication devices. The electronic devices provide various supplementary services of camera, data communication, video play, audio play, messenger, schedule management, alarm functions and the like as well as a voice communication function. The electronic devices provide various programs for using the functions, and enable users to perform input to the electronic devices through many input methods or with many input means.

Recently touchscreen devices provide touchscreen inputs, which have increased the usefulness of electronic devices while maintaining a degree of compactness, diversifying the functions of the electronic devices. These touchscreen devices arrange transparent touch panels together with display panels, thereby allowing the primary input device to double as the primary output device. These touch panels are classified into a variety of touch panels such as resistive touch panels, capacitive touch panels, ultrasonic touch panels, light (infrared) sensing touch panels, electromagnetic induction touch panels and the like.

Generally, the touchscreen device receives input data from contact generated by a user's finger. But touchscreen device may also receive input from a pen-shaped input means (generally, called a 'touch pen' or 'stylus') as an auxiliary data input means. Also, the touchscreen device is equipped with a sensing means separate from the touch panel of the touchscreen device, which enables touch pen data input and touch panel data input to be received independently of one another.

SUMMARY

Various example embodiments of the disclosure can provide a method and apparatus for processing a gesture into a function dependent on the handwriting pressure in an electronic device.

In one aspect of this disclosure, a method for processing a gesture into a function dependent on the handwriting pressure in an electronic device. The method includes detecting a pressure of a touch input made to a touchscreen of the electronic device, setting a crop mode based on an association between the crop mode and the pressure, and adjusting a crop boundary designated by the touch input according to the set crop mode.

In another aspect of this disclose, an electronic device for processing a gesture into a function dependent on the handwriting pressure is provided. The electronic device includes a touchscreen, and a controller. The controller is configured to detect a pressure of a touch input made to the touchscreen of the electronic device, set a crop mode based on an association between the crop mode and the pressure and adjust a crop boundary by the touch input according to the set crop mode.

BRIEF DESCRIPTION OF THE DRAWINGS

The present disclosure will become more apparent from the following detailed description when taken in conjunction with the accompanying drawings in which.

DETAILED DESCRIPTION

Figure 1:
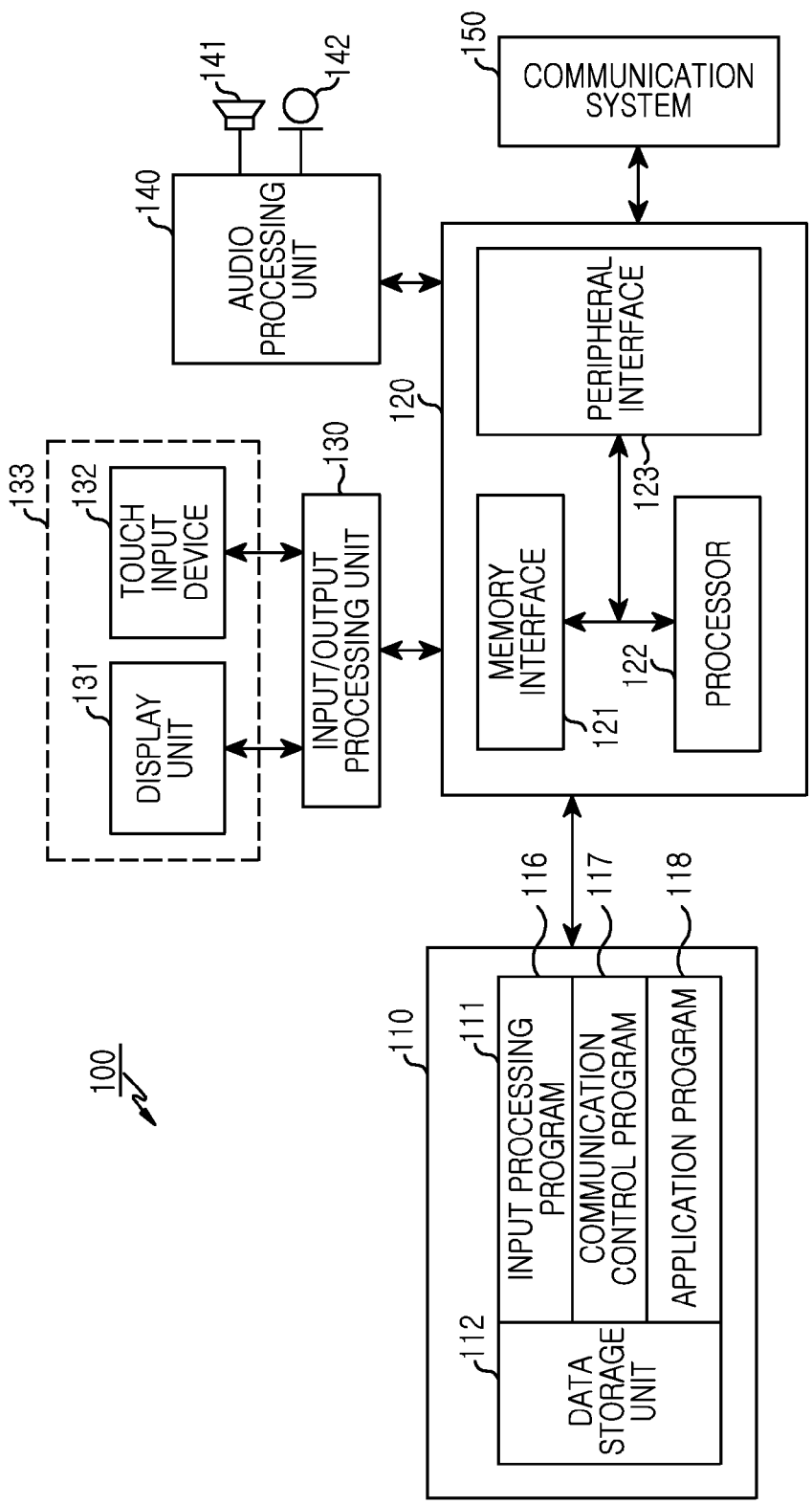
FIG. 1 is a block diagram illustrating an electronic device according to various example embodiments of the disclosure.

Preferred embodiments of the disclosure will be described herein below with reference to the accompanying drawings. In the following description, well-known functions or constructions are not described in detail since they would obscure the disclosure in unnecessary detail. And, terms described below, which are defined considering functions in the disclosure, can be different depending on user and operator's intention or practice. Therefore, the terms should be defined on the basis of the disclosure throughout this specification.

In describing various exemplary embodiments of the disclosure, an electronic device can be described on a basis of a touchscreen capable of performing an input operation of an input device and a display operation of a display unit within one physical screen. Accordingly, although the display unit and the input device are separately illustrated in a device construction of the disclosure, the display unit can be expressed to include or indicate the input device.

The disclosure is not limited only to an electronic device including a touchscreen, and will be applicable to various electronic devices physically distinguishing a display unit and an input device or including only one of the display unit and the input device. In various exemplary embodiments below, an electronic device with a touchscreen can be an electronic device that includes a touchscreen including a display unit and an input device separately, a display unit including an input device, or a display unit not including the input device.

The electronic device according to the disclosure can be one of various devices such as a mobile communication terminal, a Personal Digital Assistant (PDA), a Personal Computer (PC), a laptop computer, a smartphone, a smart Television (TV), a netbook computer, a Mobile Internet Device (MID), an Ultra Mobile PC (UMPC), a tablet PC, a mobile pad, a media player, a handheld computer, an MPEG audio layer 3 Player (MP3P), a video phone, an electronic book reader, a Portable Media Player (PMP), a mobile medical instrument, an accessory, an electronic accessory, a camera, a wearable device, an electronic watch, a wrist watch, a refrigerator, an air conditioner, a cleaner, a fuzzy robot, an audio, an oven, a microwave range, a washer, an electronic bracelet, an electronic necklace, an air cleaner, an electronic frame, a settop box, a TV box (Samsung HomeSync™, Apple TV™, or Google TV™), an electronic dictionary, a car infotainment device, a vessel electronic equipment (e.g., a vessel navigator, a gyrocompass and the like), a flight electronic instrument, a security instrument, an electronic clothing, an electronic key, a camcorder, a game console, various medical instruments (Magnetic Resonance Angiography (MRA), Magnetic Resonance Imaging (MRI), Computerized Tomography (CT), a camera, an ultrasound device and the like), a TV, a Digital Video Disk (DVD) player, a navigation device, a Global Positioning System (GPS), an Event Data Recorder (EDR), a Flight Data Recorder (FDR), a Head-Mounted Display (HMD), a flat display device, an electronic album, part of a furniture or building/structure including an electronic device, an electronic board, an electronic signature input device, a projector and the like, or a combination of them. It is obvious to those skilled in the art that the electronic device according to the disclosure is not limited to the aforementioned instruments.

In a detailed description of the disclosure below, when it is mentioned that one constituent element is 'connected' or 'accessed' to another constituent element, it should be understood that one constituent element may be directly connected or accessed to another constituent element but the third constituent element may exist in between the two constituent elements. When it is mentioned that one constituent element is 'directly connected' or 'directly accessed' to another constituent element, it should be understood that the third constituent element does not exist in between the two constituent elements.

FIG. 1 illustrates an implementation of an electronic device according to various example embodiments of the disclosure.

As illustrated in FIG. 1, the electronic device 100 includes a memory 110 and a processor unit 120, and can include other peripheral devices such as an input/output processing unit 130, an input/output device 133 including a display unit 131 and a touch input device 132, an audio processing unit 140, and a communication system 150. Each constituent element is described as follows.

The memory 110 includes a program storage unit 111 storing a program for controlling an operation of the electronic device 100, and a data storage unit 112 storing data generated during program execution. The memory 110 can store data created in the program according to an operation of a processor 122.

In processing the data of the program in the electronic device 100, the data storage unit 112 can store a function of the program, an object of the program, a keyword, an IDentification (ID) code, and information of the peripheral devices of the electronic device 100 which the program can use.

The program storage unit 111 can include an input processing program 116, a communication control program 117, and at least one application program 118. The program included in the program storage unit 111 is composed of a set of instructions and thus may be expressed as an instruction set.

The input processing program 116 can process handwriting pressure of a gestural input to the touch input device 132 with an input means. According to one example embodiment, the electronic device 100 can sense handwriting pressure of a gesture inputted to the touch input device 132 through the input processing program 116, and can determine a pressure level corresponding to the sensed handwriting pressure.

The input processing program 116 can determine a mode corresponding to a confirmed pressure level, and can process an input gesture according to the mode. For example, according to one example embodiment, when the electronic device 100 performs a crop function in an image editing program, the electronic device 100 can draw a straight line according if pressure level confirmed by the input processing program 116 indicates a straight line mode.

The communication control program 117 can include at least one software constituent element for controlling communication with at least one counterpart electronic device using the communication system 150.

For example, the communication control program 117 can search a counterpart electronic device for communication. If the counterpart electronic device for communication connection is found, the communication control program 117 can establish a connection for communication with the counterpart electronic device. The communication control program 117 can perform a performance search and session establishment procedure, and transmit/receive data with the connected counterpart electronic device through the communication system 150.

The application program 118 can include a software constituent element for at least one application program installed in the memory 110 of the electronic device 100.

According to one example embodiment, the memory 110 can perform a function of the program storage unit 111, or can perform a function of the data storage unit 112, or can perform the functions of both the program storage unit 111 and the data storage unit 112 according to need. Because of the characteristics of the electronic device 100, division of an internal physical region of the memory 110 may be unclear.

The processor unit 120 includes a memory interface 121, at least one processor 122, and a peripheral interface 123. Here, the memory interface 121, the at least one processor 122, and the peripheral interface 123 which are included in the processor unit 120 may be integrated as at least one circuit or be implemented as separate constituent elements.

The memory interface 121 can control the access of constituent elements such as the processor 122 and the peripheral interface 123, to the memory 110.

The peripheral interface 123 can control the connection of the memory interface 121 and the processor 122 with an input/output peripheral device of the electronic device 100.

The processor 122 can control the electronic device 100 to provide various multimedia services using at least one software program. The processor 122 can control the input/output processing unit 130 to display and confirm a User Interface (UI) operation of the electronic device 100 on the display unit 131. The processor 122 can control the touch input device 132 to provide a service of receiving an instruction from the external of the electronic device 100. The processor 122 can control to execute at least one program stored in the memory 110 and provide a service corresponding to the executed program.

The input/output processing unit 130 can provide an interface between the peripheral interface 123 and the input/output device 133, including the display unit 131 and the touch input device 132.

The display unit 131 can display status information of the electronic device 100, a show external inputs, images (such as a video or a still picture), as received from the processor unit 120. It may also implement and display a user interface (UI) through the display unit 131.

The touch input device 132 can provide input data generated by user's selection to the processor unit 120 through the input/output processing unit 130.

For example, the touch input device 132 may be composed of only a control button or be composed of a keypad so as to receive data for control from the external of the electronic device 100.

Further, the touch input device 132 can provide input/output to the input/output device 133 together with the display unit 131 such that the input/output can be performed in one screen. In this case, the touch input device 132 used in the input/output device 133 can use one or more of a capacitive method, a resistive (pressure sensing) method, an infrared method, an electromagnetic induction method, or an ultrasonic method.

Further, an input method of the touch input device 132 can be a method of processing to input an instruction if an input means is located at a predetermined distance from the touchscreen 133, besides a method of inputting by directly touching the touchscreen 133, and can use terms such as a hovering touch, a floating touch, an indirect touch, a proximity touch, and a non-contact input.

The input/output device 133, a device physically combining the touch input device 132 to one screen on the display unit 131, can be a touchscreen capable of inputting an instruction by touching a screen implementation displayed on the display unit 131 in an operation of the electronic device 100.

Accordingly, the touchscreen can perform all roles of the display unit 131, such as displaying the UI of the electronic device 100 and receiving inputs to the electronic device 100. Therefore, the touchscreen can be composed of the touchscreen 133 including the display unit 131 and the touch input device 132.

This disclosure illustrates the touchscreen 133 as composed of a complex touch panel in which a touch panel and a pen touch panel are implemented together. The touchscreen 133 of the electronic device 100 is not limited to the touchscreen composed of the complex touch panel, and can be applied even to a touchscreen applying a pen touch panel making only a pen touch possible.

The audio processing unit 140 can provide an audio interface between a user and the electronic device 100 through a speaker 141 and a microphone 142.

The communication system 150 can perform a communication function with a counterpart electronic device using at least any one of mobile communication through a base station, Infrared Data Association (IrDA), Bluetooth, Bluetooth Low Energy (BLE), Wireless Fidelity (WiFi), Near Field Communication (NFC), short-range wireless communication such as Zigbee, Wireless Local Area Network (WLAN) communication, and wired communication.

In describing an example embodiment of the present disclosure, display or output can be described as, for example, displaying a moving picture, a still picture or a Graphical User Interface (GUI) operation on the touchscreen 133 of the electronic device 100, or outputting a signal sound or a voice audio to the speaker 141 of the electronic device 100. Even in the following description, the terms "displaying" and "outputting" can be used as the same meaning, and can be described separately if there is a need to divide them.

Figure 2:
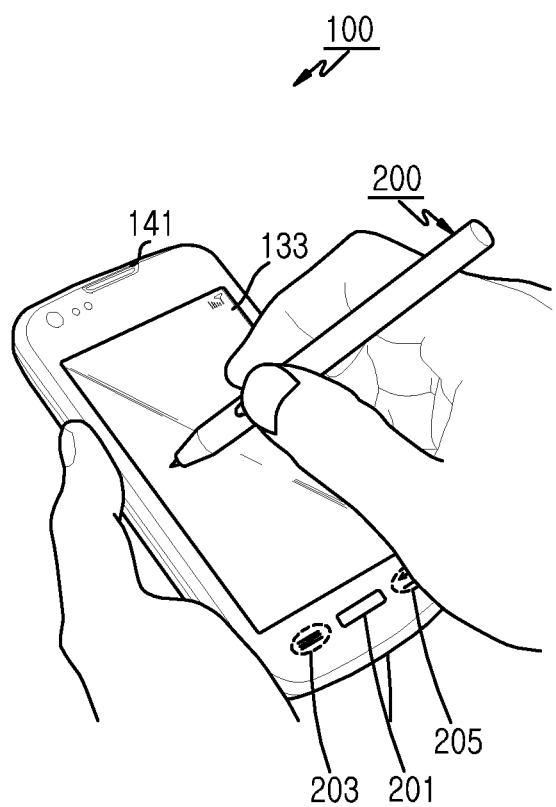
FIG. 2 is a diagram illustrating a state of handling a touch pen in an electronic device according to various example embodiments of the disclosure.

FIG. 2 illustrates a state of handling a touch pen in an electronic device according to various example embodiments of the disclosure.

Referring to FIG. 2, the electronic device 100 can include the touchscreen 133 in front thereof. The touchscreen 133 can include the display unit 131 and the touch input device 132. The display unit 131 can display the content of an operation of the electronic device 100 through a User Interface (UI). The touch input device 132 can input an instruction by a drag operation applied the touchscreen 133 with the input means, or moving the input means while holding it in a "hovering" operation (for example), maintaining it at a predetermined distance from the touchscreen 133.

The speaker 141 can be arranged at an upper side of the electronic device 100 and can output a sound. The electronic device 100 can include a clickable button 201, arranged at, for example, its lower side and capable of inputting an instruction. The electronic device 100 can include a touch button 203 or 205 capable of inputting an instruction through a touch in a fixed location. The electronic device 100 can include one or more of the speaker 141, the button 201, or the touch button 203 or 205. Although not illustrated, the speaker 141, the button 201, and the touch button 203 or 205 can be located in the aforementioned same location of the electronic device 100 or in different locations of the electronic device 100.

In performing input through the input means, the touchscreen 133 of the electronic device 100 can divide a level (hereinafter, referred to as 'pressure level') according to a handwriting pressure of touching the touchscreen 133 and can process the input into another input according to the divided level.

The electronic device 100 can automatically determine a mode of a touch input according to a pressure level of a gesture inputted to the touchscreen 133 with a touch pen 200.

According to another example embodiment, when editing a still picture through an image editing program (not shown) of the electronic device 100, the electronic device 100 can perform a crop function. When editing a still picture the crop function provides at least one line (or an area) which is drawn on the touchscreen. Wherein, the at least one line (or the area) which is drawn can cut, copy or select the still picture through the crop function. When the crop function provides a straight line mode and a curved line mode, the electronic device 100 can automatically determine a predefined mode corresponding to a handwriting pressure according to the handwriting pressure without selecting a mode from a menu.

According to one example embodiment, the image editing program (not shown) of the electronic device 100 can perform a drawing function. When the drawing function provides a straight line mode and a curved line mode, the electronic device 100 can automatically determine a predefined mode corresponding to a handwriting pressure according to the handwriting pressure without selecting a mode from a menu.

The electronic device 100 can receive an input divided into a plurality of pressure levels according to a handwriting pressure of touching the touchscreen 133, through the touchscreen 133. According to one example embodiment, an operation of dividing the input to the touchscreen 133 into the plurality of pressure levels can be divided through the touch pen (i.e., input means) 200 for inputting an instruction to an electromagnetic inductive touchscreen. According to a handwriting pressure applied when the touch pen 200 inputs an instruction by touching the touchscreen 133 with its tip portion, the touch pen 200 can vary an electromagnetic field sensible during a contact between the tip portion and the touchscreen 133 through an internal electromagnetic inductor of the touch pen 200. The touch pen 200 can determine an intensity of an input signal dividing a pressure level according to a change of electromagnetic induction. The electronic device 100 can determine an intensity of an input signal according to a handwriting pressure of an input to the touchscreen 133 with the touch pen 200. Through the intensity of the input signal, the electronic device 100 can determine a pressure level dependent on an input strength, and process the input.

In describing various example embodiments, the electronic device 100 is not limited to the electromagnetic inductive touchscreen using the predefined touch pen 200 as described herein, and is applicable even to various touchscreens capable of sensing a handwriting pressure of an input and determining a pressure level dependent on an input strength.

FIGS. 3A to 3D illustrate an operation of determining a handwriting pressure in an electronic device according to various example embodiments of the disclosure.

If the electronic device 100 inputs an instruction by performing a gesture such as a handwriting motion to the touchscreen 133 with the touch pen 200, the electronic device 100 can induce an electromagnetic induction phenomenon within the touch pen 200 according to a handwriting pressure of the handwriting motion. According to the induced electromagnetic induction phenomenon, the electronic device 100 can vary an intensity of an input signal. According to the intensity of the input signal sensed through the touchscreen 133, the electronic device 100 can process to divide an input into a plurality of pressure levels.

Figure 3A:
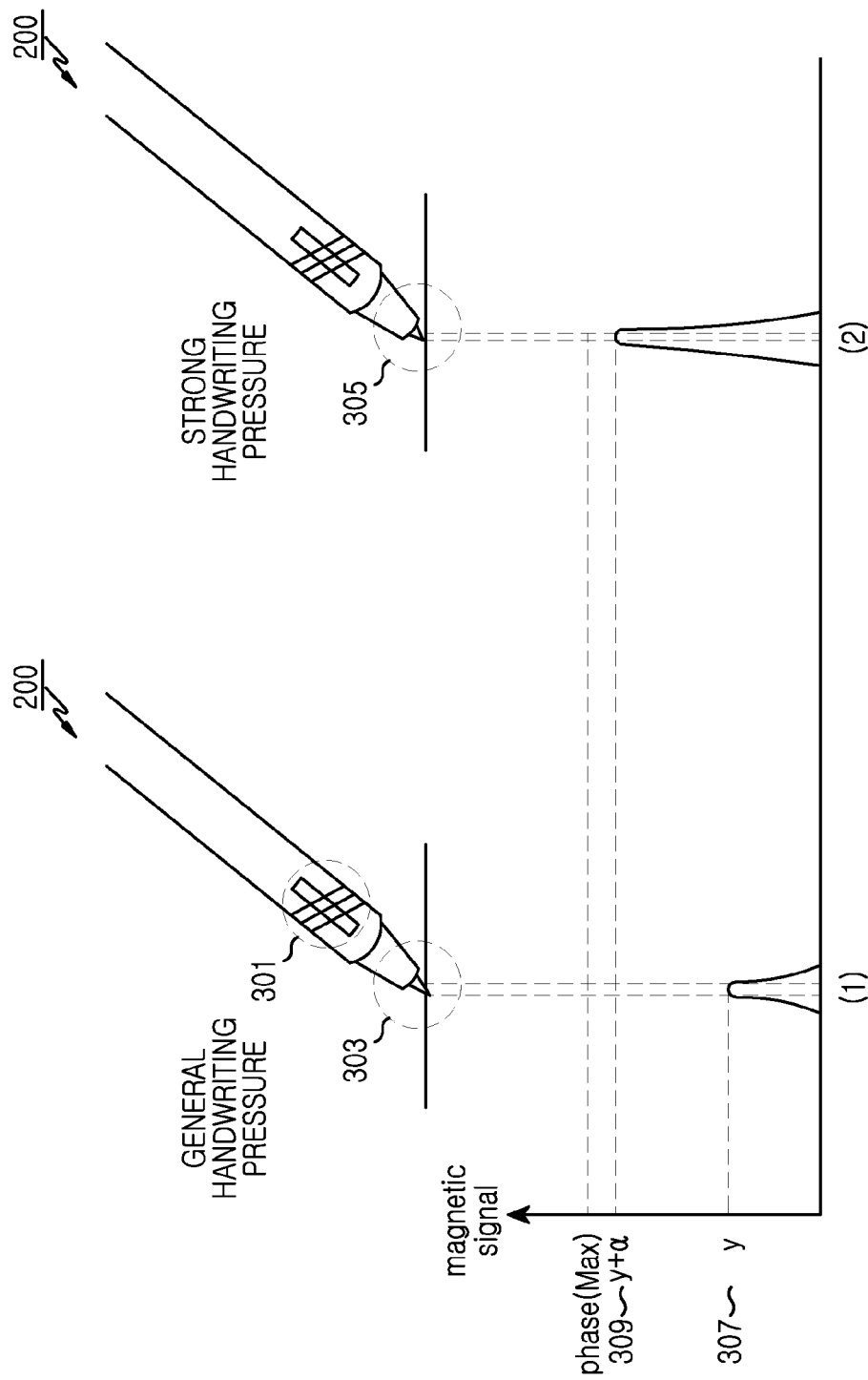
FIG. 3A, FIG. 3B, FIG. 3C and FIG. 3D are graphs illustrating an operation of determining a handwriting pressure in an electronic device according to various example embodiments of the disclosure.

FIG. 3A is a graph illustrating an operation of determining a handwriting pressure in an electronic device according to various example embodiments of the disclosure. FIG. 3A illustrates an operation of the touch pen 200 for inputting gestures at various handwriting pressures to the touchscreen 133 with the touch pen 200 in the electronic device 100, and determining a pressure level according to an intensity of an input signal of the touch pen 200 sensed through the touchscreen 133.

By inputting a gesture (such as a handwriting motion) to the touchscreen 133 of the electronic device 100 with the touch pen 200, the electronic device 100 can determine a pressure of the gesture through a tip portion 303 or 305 of the touch pen 200. The touch pen 200 can include an electromagnetic inductor 301 therein. According to the pressure determined through the tip portion 303 or 305 of the touch pen 200, the touch pen 200 can control a quality of an electromagnetic signal through the electromagnetic inductor 301. The touch pen 200 can sense an intensity of the electromagnetic signal corresponding to a handwriting pressure through the touchscreen 133 and can determine a pressure level according to the intensity of the electromagnetic signal.

In one example, a handwriting pressure that is sensed by the touch pen 200 when a user performs a handwriting motion through the touch pen 200 is described within a range of a pressure signal of '1' to '100'. In this example, a handwriting pressure of less than '1' or greater than '100' is disregarded. A variation of an electromagnetic field caused by an electromagnetic induction phenomenon occurring corresponding to the pressure signal is thus always within a range of an electromagnetic signal of '1' to '100'. The touchscreen 133 of the electronic device 100 divides and processes the aforementioned electromagnetic signal of '1' to '100' into a pressure level of '1' to '100'.

According to various example embodiments, a Y-axis of a graph of FIG. 3A denotes a pressure level corresponding to a handwriting pressure sensed by the touchscreen 133 of the electronic device 100. The pressure level can have a maximum value of '100'. In a case of a minimal value of the pressure level, when the touch pen 200 and the touchscreen 133 are in contact with each other, the electronic device 100 can detect a signal but if the detected signal does not satisfy a predefined signal threshold, the electronic device 100 may not process the detected signal into an input. In the following description, the electronic device 100 defines a minimal value of a handwriting pressure of a touch as value 'a' 317 (of FIG. 3B).

According to one example embodiment, when a user performs a gesture at a handwriting pressure of '30' 303, the electronic device 100 can determine a pressure level of '30' through an electromagnetic signal of '30' corresponding to the handwriting pressure of '30'. According to a graph (1) of FIG. 3A, a pressure level 'y' 307, corresponding to the handwriting pressure of '30' can be equal to 30.

According to one example embodiment, when the user performs a gesture at a handwriting pressure of '90' 305, the electronic device 100 can determine a pressure level of '90' through an electromagnetic signal of '90' corresponding to the handwriting pressure of '90'. According to a graph (2) of FIG. 3A, a pressure level '(y+α) 309 corresponding to the handwriting pressure of '90' can be equal to 90.

Referring to FIG. 3A, the tip portion 303 or 305 of the touch pen 200 is operated responsive to a handwriting pressure separately from a body of the touch pen 200. The tip portion 303 or 305 of the touch pen 200 can induce an electromagnetic induction phenomenon according to the handwriting pressure applied to the touch pen 200 without any required special motion or input.

Figure 3B:
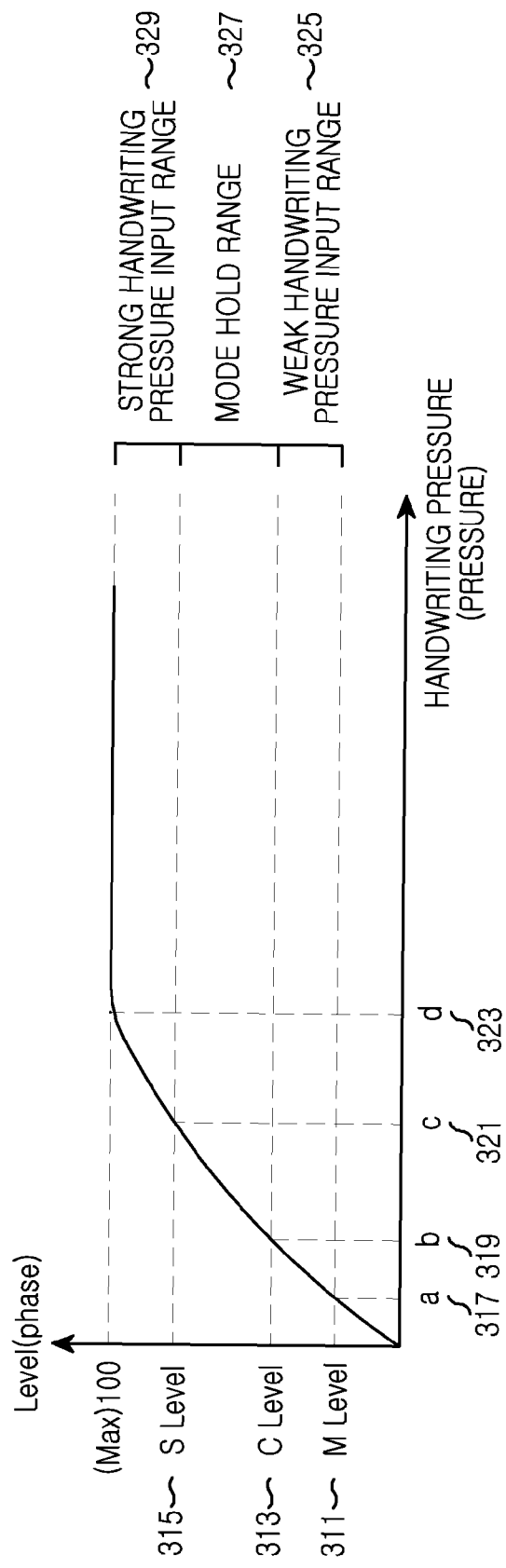

FIG. 3B is a graph illustrating an operation of determining a handwriting pressure in an electronic device according to various example embodiments of the disclosure. In FIG. 3B, a description can be made for a mode of an input gesture that is determined according to a handwriting pressure when a user performs the input gesture to the touchscreen 133 with the touch pen 200.

Referring to a graph of FIG. 3B, an X-axis denotes a handwriting pressure and a Y-axis denotes a pressure level. The electronic device 100 can determine a pressure level corresponding to a handwriting pressure of a gesture inputted through the touchscreen 133 of the electronic device 100. In the graph of FIG. 3B, the Y-axis pressure level value is expressed as an analog continuous value, but may be expressed as a digital stepwise value. In a case of the expression using the digital stepwise value, the electronic device 100 can define the Y-axis pressure level value as '1' to '100' as mentioned in FIG. 3A according to various example embodiments of the disclosure.

When editing a still picture through an image editing program (not shown), the electronic device 100 can perform a crop function. When the crop function provides a straight line mode and a curved line mode, the electronic device 100 can automatically determine a predefined mode corresponding to a handwriting pressure according to the handwriting pressure.

To automatically determine the mode corresponding to the handwriting pressure, the electronic device 100 can define a reference pressure level for mode determination in a setting step for determining the mode of the electronic device 100, and store the reference pressure level in the memory 110.

According to various example embodiments, to automatically determine the mode corresponding to the handwriting pressure, the electronic device 100 can define two reference pressure levels for mode determination. The electronic device 100 can define a reference pressure level with reference to an input to the touchscreen 133 with the touch pen 200. If a handwriting pressure of a gesture inputted with the touch pen 200 satisfies a predefined reference pressure level, the electronic device 100 can automatically change a mode according to the handwriting pressure. According to one example embodiment, in a reference for automatically determining a mode according to a handwriting pressure of a gesture, when it is a strong handwriting pressure greater than a 1st pressure level, the electronic device 100 can determine that it is a straight line mode and, when it is a weak handwriting pressure less than or equal to a 2nd pressure level, the electronic device 100 can determine that it is a curved line mode.

According to one example embodiment, in FIG. 3B, if a handwriting pressure of a gesture inputted with the touch pen 200 is stronger than a handwriting pressure 'c' 321 corresponding to a predefined 'Straight (S) level' 315, the electronic device 100 can change a mode of a crop function of the touch pen 200 into the straight line mode. When the mode of the crop function of the touch pen 200 is the straight line mode, if the user inputs a gesture to the touchscreen 133 with the touch pen 200, the electronic device 100 can determine a crop path as a straight line according to a movement distance of the touch pen 200 in a direction sensed when the mode is changed into the straight line mode. At this time, if the handwriting pressure of the input gesture is greater than 'd value' 323 being a maximum value of a handwriting pressure range of the touch pen 200, the electronic device 100 can determine as a maximum value '(MAX) 100' a pressure level corresponding to the handwriting pressure greater than 'd value' 323.

According to the aforementioned example embodiment, in determining a pressure level range used to select a straight line mode of a crop function, the electronic device 100 can define a pressure level range of 'S level' 315 to '(MAX) 100' corresponding to a handwriting pressure range of 'c value' 321 to 'd value' 323 of a gesture that the user inputs with the touch pen 200. A handwriting pressure greater than 'd value' 323 may not be sensed. The maximum value of the pressure level range can be '(MAX) 100'.

According to one example embodiment, in FIG. 3B, if a handwriting pressure of a gesture inputted with the touch pen 200 is weaker than a handwriting pressure 'b value' 319 corresponding to a predefined 'Curve (C) level' 313, the electronic device 100 can change the mode of the crop function of the touch pen 200 into a curved line mode. When the mode of the crop function of the touch pen 200 is the curved line mode, if the user inputs a gesture to the touchscreen 133 with the touch pen 200, the electronic device 100 can determine a crop path according to the gesture drawn by the touch pen 200. If the handwriting pressure of the input gesture is less than 'a value' 317, the electronic device 100 may determine that there is no input of an instruction through the touch pen 200.

According to the aforementioned example embodiment, in determining a pressure level range for selecting a curved line mode of the crop function, the electronic device 100 can determine a pressure level range of 'Minimum (M) level' 311 to 'S level' 315 corresponding to a handwriting pressure range of 'a' 317 to 'b' 319. A handwriting pressure less than 'a' 317 may not be processed as an input. The minimum value of the pressure level range can be 'M level' 311.

According to one example embodiment, in FIG. 3B, if a handwriting pressure of a gesture inputted with the touch pen 200 is stronger than 'b value' 319 corresponding to 'C level' 313 and is weaker than 'c value' 321 corresponding to 'S level' 315, the electronic device 100 can hold the mode of the crop function of the touch pen 200 as an existing mode. According to one example embodiment, the existing mode may be neither the curved line mode nor the straight line mode but be a free mode capable of drawing freely according to a motion of the touch pen 200.

When the user begins a gesture input to the touchscreen 133 with the touch pen 200, if a handwriting pressure is stronger than 'a' 317 (i.e., when a pressure level reaches 'M level' 311), the electronic device 100 can determine that it is the curved line mode. When the user increases and makes the handwriting pressure applied to the touch pen 200 stronger than 'b' 319 and weaker than 'c' 321, the electronic device 100 can hold the curved line mode without changing the mode of the crop function of the touch pen 200. When the user increases and makes the handwriting pressure applied to the touch pen 200 stronger than 'c' 321 (i.e., when the pressure level reaches 'S level' 315), the electronic device 100 can change the mode of the crop function of the touch pen 200 into the straight line mode. When the user decreases and makes the handwriting pressure applied to the touch pen 200 weaker than 'c' 321 and stronger than 'b' 319, the electronic device 100 can hold the straight line mode without changing the mode of the crop function of the touch pen 200. When the user decreases and makes the handwriting pressure applied to the touch pen 200 weaker than 'b' 319 (i.e., when the pressure level reaches 'C level' 313), the electronic device 100 can change the mode of the crop function of the touch pen 200 into the curved line mode.

According to one example embodiment, in FIG. 3B, the electronic device 100 can add various modes, without limiting the mode to the straight line mode or the curved line mode.

The electronic device 100 can add, for example, a corrected path mode to a pressure level range greater than 'C level' 313 and less than the maximum value '(MAX) 100'. When the user begins a gesture input to the touchscreen 133 with the touch pen 200, if a handwriting pressure is stronger than 'a' 317 (i.e., when a pressure level reaches 'M level' 311), the electronic device 100 can determine that it is the curved line mode. When the user increases and makes the handwriting pressure applied to the touch pen 200 stronger than 'b' 319 and weaker than 'c' 321 (i.e., when the pressure level reaches 'C level' 313), the electronic device 100 can change the mode of the crop function of the touch pen 200 into the corrected path mode. When the user increases and makes the handwriting pressure applied to the touch pen 200 stronger than 'c' 321 (i.e., when the pressure level reaches 'S level' 315), the electronic device 100 can change the mode of the crop function of the touch pen 200 into the straight line mode. When the user decreases and makes the handwriting pressure applied to the touch pen 200 weaker than 'c' 321 and stronger than 'b' 319 (i.e., when the pressure level reaches 'S level' 315), the electronic device 100 can change the mode of the crop function of the touch pen 200 into the corrected path mode. When the user decreases and makes the handwriting pressure applied to the touch pen 200 weaker than 'b' 319 (i.e., when the pressure level reaches 'C level' 313), the electronic device 100 can change the mode of the crop function of the touch pen 200 into the curved line mode.

Figure 3C:
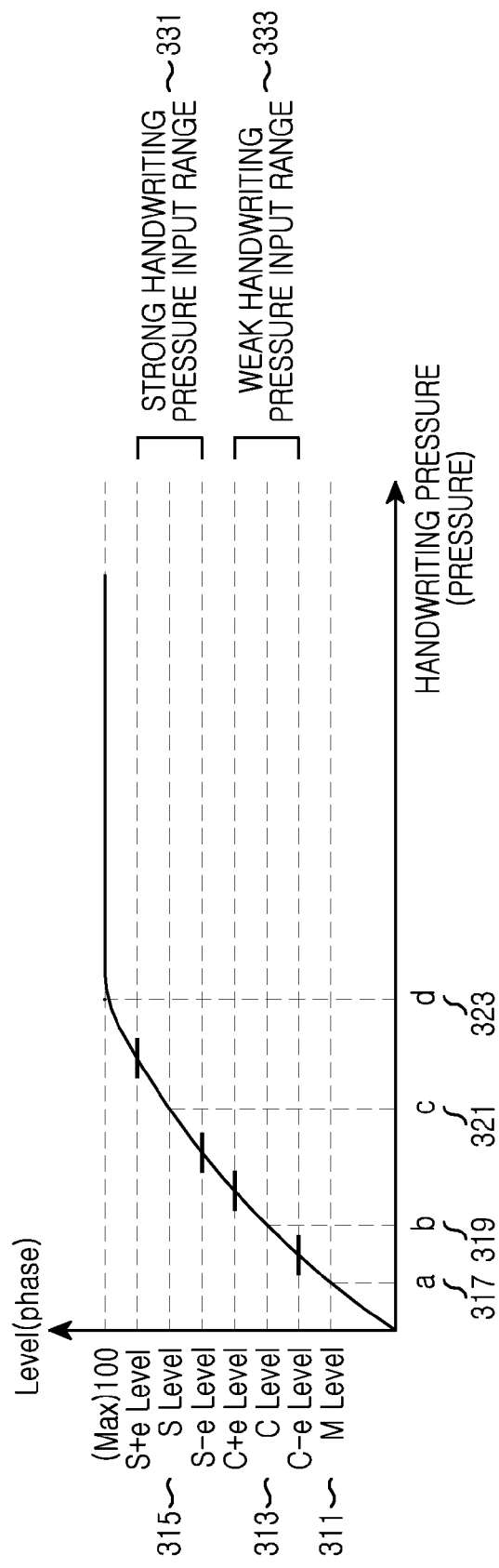

FIG. 3C is a graph illustrating an operation of determining a handwriting pressure in an electronic device according to various example embodiments of the disclosure.

According to various example embodiments, to automatically determine a mode corresponding to a handwriting pressure, the electronic device 100 can define two reference pressure levels for mode determination. The electronic device 100 can define a reference pressure level with reference to a habit in which a user inputs to the touchscreen 133 through the touch pen 200. The electronic device 100 can define as a reference input range a predetermined pressure level range centering on the reference pressure level. If a handwriting pressure of a gesture inputted with the touch pen 200 is within the reference input range, the electronic device 100 can automatically change the mode. According to one example embodiment, in a reference for automatically determining a mode according to a handwriting pressure of a gesture, when a strong handwriting pressure is included in a 1st reference input range, the electronic device 100 can determine that it is a straight line mode and, when it is a weak handwriting pressure included in a 2nd reference input range, the electronic device 100 can determine that it is a curved line mode.

According to one example embodiment of defining the reference pressure level, the electronic device 100 can receive multi-time strong handwriting pressures in a setting step for determining a mode of the electronic device 100, and define a pressure level corresponding to an average value of the received multi-time strong handwriting pressures, as a reference pressure level 'S level' 315 corresponding to the strong handwriting pressure. In a similar method, the electronic device 100 can receive multi-time weak handwriting pressures in the setting step for determining the mode, and define a pressure level corresponding to an average value of the received multi-time weak handwriting pressures, as a reference pressure level 'C level' 313 corresponding to the weak handwriting pressure.

The electronic device 100 can define as a 'strong handwriting pressure input range' 331 a pressure level range of 'S+e level' to 'S-e level' centering on the reference pressure level 'S level' 315 corresponding to the strong handwriting pressure. The electronic device 100 can define as a 'weak handwriting pressure input range' 333 a pressure level range of 'C+c level' to 'C-c level' centering on the reference pressure level 'C level' 313 corresponding to the weak handwriting pressure.

According to one example embodiment, in FIG. 3C, if a pressure level corresponding to a handwriting pressure of a gesture inputted with the touch pen 200 is included in the 'strong handwriting pressure input range' 331, the electronic device 100 can change a mode of the touch pen 200 from a crop function to the straight line mode. When the mode of the crop function of the touch pen 200 is the straight line mode, if the user inputs a gesture to the touchscreen 133 with the touch pen 200, the electronic device 100 can determine a crop path as a straight line according to a movement distance of the touch pen 200 in a direction sensed.

According to one example embodiment, in FIG. 3C, if the pressure level is included in the 'weak handwriting pressure input range' 333, the electronic device 100 can change the mode of the crop function of the touch pen 200 to the curved line mode. When the mode of the crop function of the touch pen 200 is the curved line mode, if the user inputs the gesture to the touchscreen 133 with the touch pen 200, the electronic device 100 can determine a crop path according to the gesture drawn by the touch pen 200.

According to one example embodiment, in FIG. 3C, if the pressure level corresponding to the handwriting pressure of the gesture inputted with the touch pen 200 is included in neither the 'strong handwriting pressure input range' 331 nor the 'weak handwriting pressure input range' 333, the electronic device 100 can hold the mode of the crop function of the touch pen 200 as an existing mode.

Figure 3D:
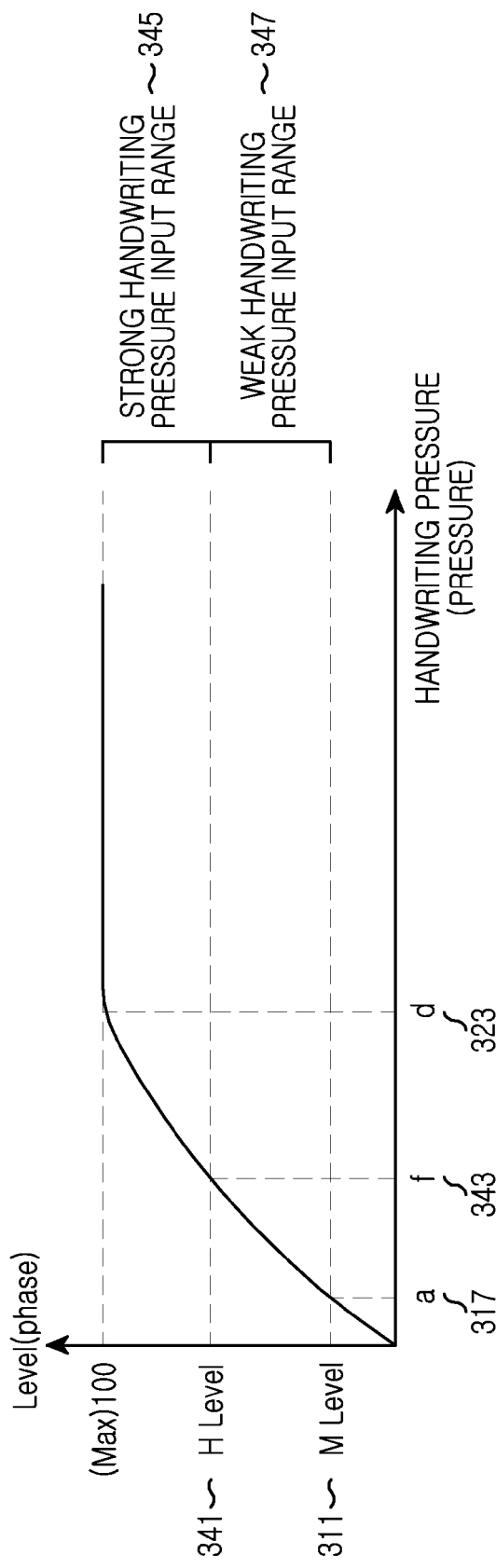

FIG. 3D is a graph illustrating an operation of determining a handwriting pressure in an electronic device according to various example embodiments of the disclosure.

According to various example embodiments, to automatically determine a mode corresponding to a handwriting pressure, the electronic device 100 can define one reference pressure level for mode determination. The electronic device 100 can define a reference pressure level with respect to a user input to the touchscreen 133 through the touch pen 200. If a handwriting pressure of a gesture inputted with the touch pen 200 reaches the reference pressure level, the electronic device 100 can automatically change a mode. According to one example embodiment, in a reference for automatically determining a mode according to a handwriting pressure of a gesture, when it is a strong handwriting pressure greater than the reference pressure level, the electronic device 100 can determine that it is a straight line mode and, when it is a weak handwriting pressure less than or equal to the reference pressure level, the electronic device 100 can determine that it is a curved line mode.

According to one example embodiment, in FIG. 3D, if a handwriting pressure of a gesture inputted with the touch pen 200 is stronger than a handwriting pressure 'f' 343 corresponding to a predefined 'Half (H) level' 341, the electronic device 100 can change a mode of a crop function of the touch pen 200 into the straight line mode. When the mode of the crop function of the touch pen 200 is the straight line mode, if the user inputs a gesture to the touchscreen 133 with the touch pen 200, the electronic device 100 can determine a crop path as a straight line according to a movement distance of the touch pen 200 in a direction sensed when the mode is changed into the straight line mode. At this time, if the handwriting pressure of the input gesture is greater than 'd' 323 being a maximum value of a handwriting pressure range of the touch pen 200, the electronic device 100 can determine as a maximum value '(MAX) 100' a pressure level corresponding to the handwriting pressure greater than 'd' 323.

According to the aforementioned example embodiment, in defining a pressure level range of determining the mode of the crop function of the touch pen 200 as the straight line mode, the electronic device 100 can define a pressure level range of 'H level' 341 to '(MAX) 100' corresponding to a handwriting pressure range of 'f' 343 to 'd' 323 of a gesture that the user inputs with the touch pen 200. A handwriting pressure greater than 'd' 323 may not be sensed. The maximum value of the pressure level range can be '(MAX) 100'.

According to one example embodiment, in FIG. 3D, if a handwriting pressure of a gesture inputted with the touch pen 200 is weaker than a handwriting pressure 'f' 343 corresponding to a predefined 'H level' 341, the electronic device 100 can change a mode of a crop function of the touch pen 200 into the curved line mode. When the mode of the crop function of the touch pen 200 is the curved line mode, if the user inputs a gesture to the touchscreen 133 with the touch pen 200, the electronic device 100 can determine a crop path according to the gesture drawn by the touch pen 200. At this time, if the handwriting pressure of the input gesture is less than 'a' 317, the electronic device 100 may determine that it does not input an instruction through the touch pen 200.

According to the aforementioned example embodiment, in defining a pressure level range of determining the mode of the crop function of the touch pen 200 as the curved line mode, the electronic device 100 can define a pressure level range of 'M level' 311 to 'H level' 341 corresponding to a handwriting pressure range of 'a' 317 to 'f' 343 of a gesture that the user inputs with the touch pen 200. A handwriting pressure less than 'a' 317 may not be processed as an input. The minimum value of the pressure level range can be 'M level' 311.

When the user begins a gesture input to the touchscreen 133 with the touch pen 200, if a handwriting pressure is stronger than 'a' 317 (i.e., when a pressure level reaches 'M level' 311), the electronic device 100 can determine that it is the curved line mode. When the user increases and makes the handwriting pressure applied to the touch pen 200 stronger than 'f' 343 (i.e., when the pressure level reaches 'H level' 341), the electronic device 100 can change the mode of the crop function of the touch pen 200 into the straight line mode. When the user decreases and makes the handwriting pressure applied to the touch pen 200 weaker than 'f' 343 (i.e., when the pressure level reaches 'H level' 341), the electronic device 100 can change the mode of the crop function of the touch pen 200 into the curved line mode.

According to the example embodiments aforementioned in FIGS. 3A to 3D, in defining two reference pressure levels, the electronic device 100 is not limited to defining one or two reference pressure levels, and can define a plurality of reference pressure levels. The electronic device 100 can define various modes corresponding to handwriting pressure ranges divided according to the plurality of reference pressure levels, and can automatically determine a mode corresponding to a handwriting pressure of a gesture inputted with the touch pen 200.

Figure 4A:
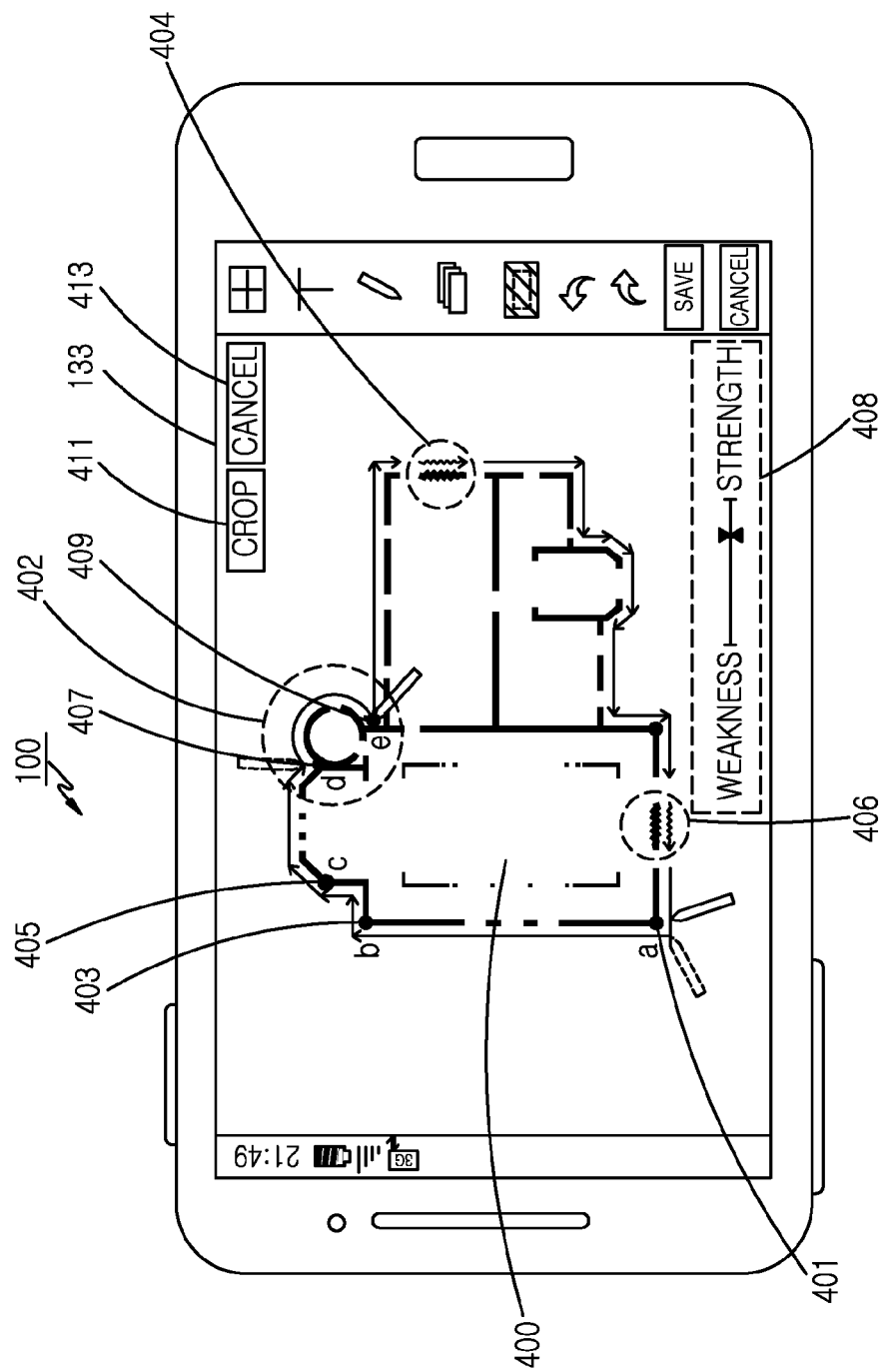
FIG. 4A and FIG. 4B are diagrams illustrating an operation of determining a mode according to a handwriting pressure in an electronic device according to various example embodiments of the disclosure.
Figure 4B:
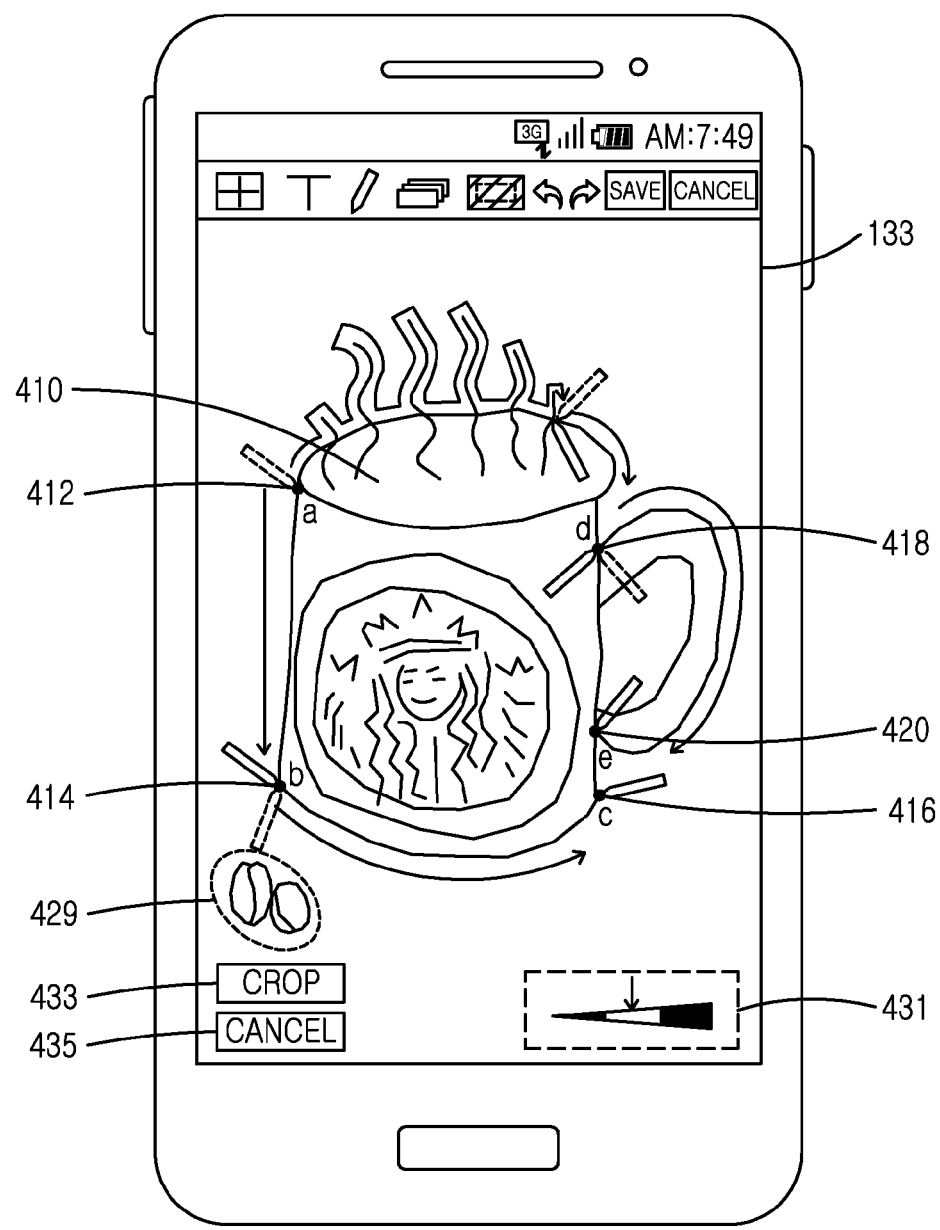

FIGS. 4A and 4B illustrate an operation of determining a mode according to a handwriting pressure in an electronic device according to various example embodiments of the disclosure.

When editing a still picture through an image editing program (not shown), the electronic device 100 can perform a crop function, and can automatically determine a predefined mode corresponding to a handwriting pressure according to the handwriting pressure without selecting a mode from a menu in the crop function.

Referring now to FIG. 4A, the electronic device 100 can automatically select a mode according to a handwriting pressure of a gesture inputted with the touch pen 200 in a crop function, and can crop an object 400 consisting of a straight line and a curved line.

The electronic device 100 can provide a straight line mode and a curved line mode, each associated with a predefined reference pressure level range, and can automatically determine a mode according to a handwriting pressure of a gesture inputted with the touch pen 200.

According to one example embodiment, the electronic device 100 can determine a region to be cropped starting from one point of a still picture displayed on the touchscreen 133. When intending to begin a crop motion from 'a point' 401 of the object 400 displayed on the touchscreen 133, the electronic device 100 can get the touch pen 200 in contact with 'a point' 401 and begin the crop motion.

When drawing a straight line path from 'a point' 401 of the object 400 displayed on the touchscreen 133 to 'b point' 403 through the crop function, the electronic device 100 can detect and determine whether a handwriting pressure of the touch pen 200 in contact with 'a point' 401 is greater than 'f value' 343 and 'H level' 341 (of FIG. 3D), and activate a straight line mode in response. The electronic device 100 then senses motion of dragging the input across the touchscreen 133 to 'b point' 403 while the handwriting pressure is maintained greater than 'f' 343. The electronic device 100 can display on the touchscreen 133 an indicator 408 capable of confirming a handwriting pressure of a gesture inputted with the touch pen 200. Through the indicator 408, the electronic device 100 can confirm the handwriting pressure of the input gesture or a mode corresponding to the handwriting pressure.

When an angle of a straight line is changed from 'b' 403 to 'c' 405, or the angle is suddenly changed to form an angular point, the electronic device 100 can draw a crop path according to a method predefined in the electronic device 100. According to one example embodiment, when the electronic device 100 completes the straight line from 'a' 401 to 'b' 403 in the straight line mode, and detects a change of handwriting pressure to the straight line mode of the crop function of the touch pen 200 into another mode and again return to the original straight line mode, the electronic device 100 can provide to reset an angle of the drawn straight line. As in the aforementioned method, the electronic device 100 can draw a straight line to 'd' 407 through the method predefined in the electronic device 100.

When drawing a curved line from 'd' 407 to 'e' 409, the electronic device 100 may detect the handwriting pressure to be weaker than 'f' 343. The electronic device 100 may thus confirm the pressure level is less than 'H level' 341 and change the mode of the crop function to a curved line mode. The electronic device 100 can sense a gesture inputted with the touch pen 200 in a state of maintaining the handwriting pressure less than 'f' 343 and can draw a curved line (i.e., a curved line region 402) along a path of the input gesture.

When again drawing a straight line from 'e' 409, the electronic device 100 can detect the handwriting pressure to have increased to a point where it is stronger than 'f' 343. The electronic device 100 can confirm a pressure level greater than 'H level' 341, and, in response, change the mode of the crop function of the touch pen 200 into the straight line mode. The electronic device 100 senses that the handwriting pressure is maintained at a level greater than 'f' 343 and thus draws a straight line along a path of the input gesture.

While drawing the straight line in the straight line mode, by changing a handwriting pressure of an input gesture, the electronic device 100 can change the straight line mode to the curved line mode and draw curved line regions 404 and 406 in a method similar to the aforementioned method of drawing the curved line region 402. The electronic device 100 can determine the straight line mode or curved line mode through a handwriting pressure of a gesture inputted with the touch pen 200 at a crop motion starting from 'a' 401 and draw a corresponding straight line or curved line, and can complete a closed region along an edge boundary of the object 400 by means of the straight line and curved line drawn in the aforementioned method.

When selecting a crop icon 411 displayed on the touchscreen 133, the electronic device 100 can determine a perfect closed region as a crop region. When selecting a cancel icon 413, the electronic device 100 can release the displaying of the straight line and curved line drawn at the crop motion or the perfect closed region consisting of a straight line and/or a curved line.

Referring now to FIG. 4B, according to various example embodiments, the electronic device 100 can automatically select a mode according to a handwriting pressure of a gesture inputted with the touch pen 200 in a crop function, and can crop a 1st object 410 using a combination of straight lines and curved lines.

The electronic device 100 can provide a straight line mode, a curved line mode, and a corrected path mode through a predefined reference pressure level in the crop function, and can automatically determine a mode according to a handwriting pressure of a gesture inputted with the touch pen 200.

According to one example embodiment, when cropping the 1st object 410 of a still picture displayed on the touchscreen 133, the electronic device 100 can detect a region is to be cropped including the 1st object 410 through a drawing motion. When the electronic device 100 draws a straight line path from 'a' 412 of the 1st object 410 displayed on the touchscreen 133 to 'b' 414, the electronic device 100 detects that a handwriting pressure of the touch pen 200 is greater than a certain threshold pressure (such as 'c' 321 of FIG. 3B, and a pressure level greater than 'S level' 315) and thereby set a mode of the crop function of the touch pen 200 to be the straight line mode. The electronic device 100 can sense a drag gestural input from 'b' 414 in a state of maintaining the handwriting pressure (greater than 'c' 321 of FIG. 3B). The electronic device 100 can display on the touchscreen 133 an indicator 431 capable of confirming a handwriting pressure of a gesture inputted with the touch pen 200. Through the indicator 431, the electronic device 100 can confirm a handwriting pressure of an input gesture or a mode corresponding to the handwriting pressure.

When drawing a line being neither a perfect straight line nor severely curved line from 'b' 414 to 'c' 416, the electronic device 100 can detect that the handwriting pressure of the touch pen 200 exceeds a first threshold but is smaller than a second larger threshold (such as being greater than 'b' 319 and less than 'c' 321 in FIG. 3B). The electronic device 100 may then confirm a pressure level between 'C level' 313 and 'S level' 315 and activate the corrected path mode. According to one example embodiment, the corrected path mode provides the line correcting minute shaking or angle change with maintaining a straightness between the straight line mode and the curved line mode.

When an angle of a line is changed like a line drawn from 'c' 416 to 'e' 420 or when the angle is suddenly changed to form an angular point, the electronic device 100 can provide to draw a crop path according to a method predefined in the electronic device 100. According to one example embodiment, the electronic device 100 draws and completes a path from 'b' 414 to 'c' 416 in the corrected path mode. When the electronic device 100 detects a change in pressure to a designated pressure range, it may change the corrected path mode to another mode, such as the curved line mode. Alternatively, it may change the corrected path mode into another mode and return to the corrected path mode. In these situations, the electronic device 100 can provide the possibility of resetting an angle a drawn line. As in the aforementioned method, the electronic device 100 can draw a mode-dependent line to 'e' 420 through the method predefined in the electronic device 100.

The electronic device 100 can sense a gestural drag operation to 'c' 416 while detecting continued maintenance of handwriting pressure (that is, for example, greater than 'b' 319 and less than 'c' 321 of FIG. 3B). When defining a region to be cropped in the corrected path mode, the electronic device 100 can sense a gesture inputted along a region consisting of a line being neither a perfectly straight nor severely curved, like a line drawn from 'b point' 414 to 'c' 416. The electronic device 100 can correct the input gesture (such as the drawn line) in the corrected path mode set to the memory 110.

According to one example embodiment, even when the electronic device 100 releases a touch during a crop motion, the electronic device 100 can connect the end of a straight line or curved line and keep performing the crop motion, if the user does not cancel the crop motion through the cancel icon 435.

When a direction of a drawing line is changed many times (like a line drawn from 'a' 412 to 'd' 418) or when an angle is suddenly changed to form an angular point, the electronic device 100 may detect a change in handwriting pressure of a gesture to be weaker than a threshold (such as 'b' 319 and 'C level' 313 of FIG. 3B) and change a mode of the crop function of the touch pen 200 into the curved line mode. The electronic device 100 can sense a gesture inputted with the touch pen 200 when the user maintains a handwriting pressure less than for example, 'f' 343 of FIG. 3B, and can draw a curved line along a path of the input gesture. According to one example embodiment, in drawing along the edge of the 1st object 410 ranging from 'a' 412 to 'd' 418, or ranging from 'd' 418 to 'e' 420 and completing a closed region to set a crop region, the electronic device 100 may detect various changes in the handwriting pressure of an input gesture and draws along the desired crop path using both handwriting pressures corresponding to two or more modes. Accordingly, the electronic device 100 can automatically activate the corresponding two or more modes according to gesture input pressure, and simultaneously perform a cropping function.

The electronic device 100 can set the straight line mode, the curved line mode, or the corrected path mode through a handwriting pressure of a gesture inputted with the touch pen 200. By the straight line and curved line drawn in the aforementioned method, the electronic device 100 can complete the closed region along the edge boundary of the object 400.

In response to selecting a crop icon 433 displayed on the touchscreen 133, the electronic device 100 can determine the completed closed region as a crop region. If selecting a cancel icon 435, the electronic device 100 can release displaying of the straight line or curved line drawn through the crop motion, or the closed region including the straight line and/or curved line.

When the electronic device 100 completes a closed region through a crop motion even for a 2nd object 429 other than the 1st object 410, the electronic device 100 can process the cropping of the 2nd object 429 and the 1st object 410 together, or independently, as desired.

FIGS. 5A to 5D illustrate an operation of processing a gesture according to a handwriting pressure in an electronic device according to various example embodiments of the disclosure.

To define a mode according to a handwriting pressure of a gesture inputted to the touchscreen 133, the electronic device 100 can divide and define two or more mode ranges within a pressure level range capable of being sensed by the electronic device 100 and can define a mode in each mode range. In defining the aforementioned mode range, the electronic device 100 can use a method of defining a reference pressure level and defining a pressure level range as the aforementioned mode range.

The electronic device 100 can sense a pressure level corresponding to a handwriting pressure of a gesture inputted to the touchscreen 133 with the touch pen 200. The electronic device 100 can confirm a range including the sensed pressure level. The electronic device 100 can automatically change a mode into a defined mode corresponding to the confirmed range.

Figure 5A:
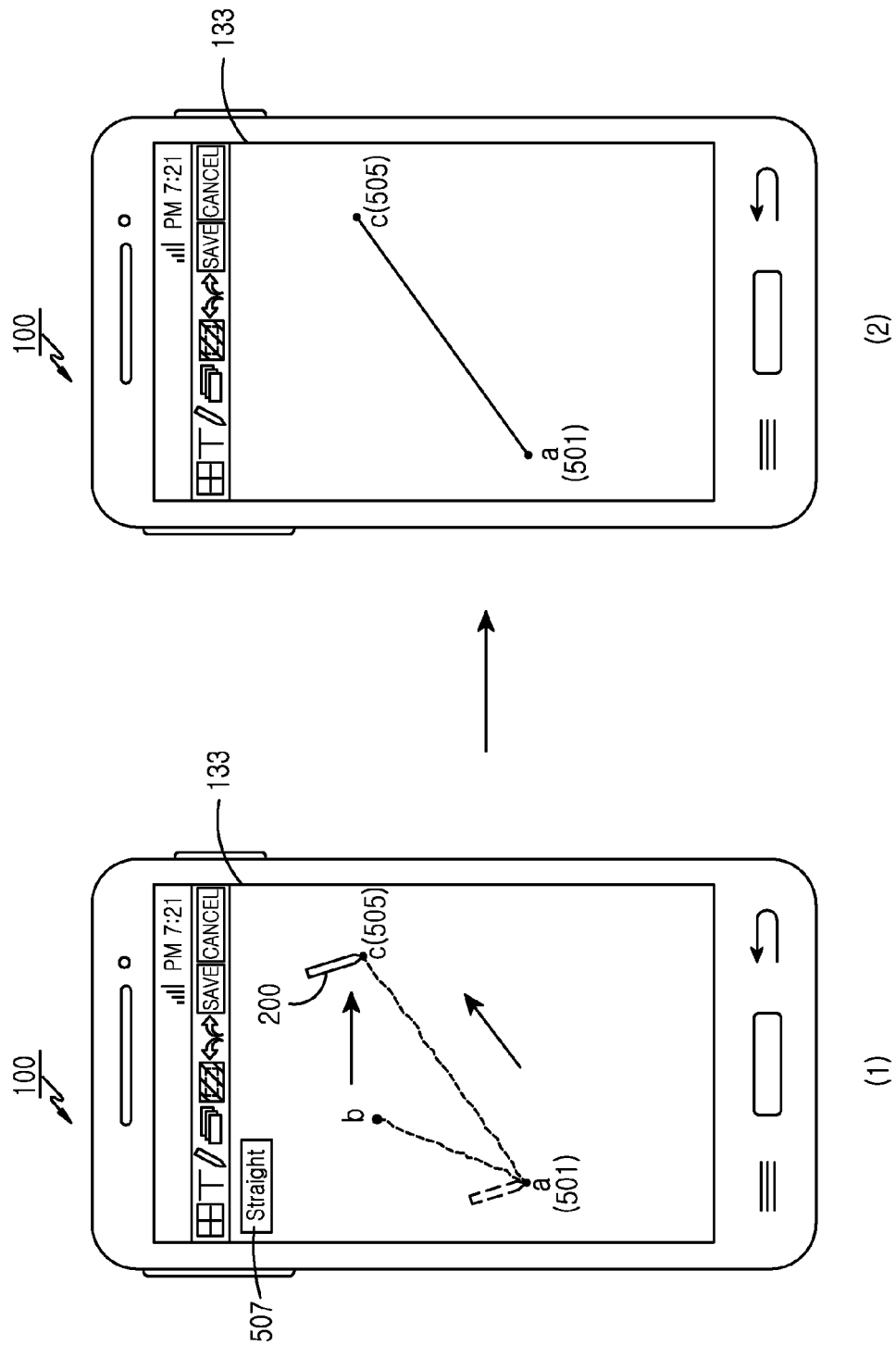
FIG. 5A, FIG. 5B, FIG. 5C and FIG. 5D are diagrams illustrating an operation of processing a gesture according to a handwriting pressure in an electronic device according to various example embodiments of the disclosure.

Referring now to FIG. 5A, the electronic device 100 can automatically determine a mode according to a pressure level corresponding to a handwriting pressure of a gesture inputted to the touchscreen 133 with the touch pen 200. In performing an operation according to the determined mode, the electronic device 100 can adjust the handwriting pressure of the gesture inputted to the touchscreen 133 and hold the determined mode during the operation.

To perform an operation according to a mode, the electronic device 100 can maintain a pressure level corresponding to the mode by maintaining a handwriting pressure of a gesture inputted to the touchscreen 133.

Various example embodiments can be described with reference to FIG. 3B. The electronic device 100 can define a pressure level corresponding to a strong handwriting pressure as a pressure level range of 'S level' 315 to '(MAX) 100', and can define a mode corresponding to the strong handwriting pressure as a straight line mode. When inputting a gesture at a handwriting pressure stronger than 'c' 321 to the touchscreen 133 with the touch pen 200, the electronic device 100 can determine the straight line mode corresponding to a pressure level greater than 'S level' 315. In performing an operation of a crop function in the straight line mode, the electronic device 100 can draw a straight line despite any minor input variations, such as shaking or direction changes in the gesture input of the touch pen 200.

According to one example embodiment, the electronic device 100 can determine a mode according to a handwriting pressure and draw a straight line from 'a' 501 to 'c' 505 on the touchscreen 133. The electronic device 100 can contact of the touch pen 200 with 'a point' 501. If a handwriting pressure of the gesture is stronger than 'c' 321 of FIG. 3B, the electronic device 100 can sense a pressure level greater than 'S level' 31, whereupon the electronic device 100 can determine and set a straight line mode. The electronic device 100 can perform a motion of drawing from 'a point' 501 to 'c point' 505 with the touch pen 200, and the electronic device 100 can sense the drawing motion performed by the touch pen 200. If sensing that a pressure level of the gesture inputted with the touch pen 200 is greater than 'S level' 315 during drawing a path from 'a' 501 to 'c' 505, despite shaking or variations in direction change during the drawing, the electronic device 100 nevertheless displays a straight line drawn from 'a point' 501 to 'c point' 505, without applying variations from shaking or direction change to the displayed straight line.

According to one example embodiment, the electronic device 100 can sense a motion of getting the touch pen 200 in contact with 'a' 501. If a handwriting pressure of a gesture inputted with the touch pen 200 is stronger than 'c' 321, the electronic device 100 can sense a pressure level stronger than 'S level' 315. If the pressure level is greater than 'S level' 315, the electronic device 100 can set the straight line mode. The electronic device 100 can perform a motion of drawing from 'a' 501 to 'b' (unnumbered) with the touch pen 200. The electronic device 100 can sense the drawing motion performed by the touch pen 200. In performing the crop motion on the touchscreen 133, if intending to draw a straight line from 'a' 501 to 'c' 505, the user can draw the line from 'b' (unnumbered) to 'c point' 505 while maintaining the handwriting pressure of the gesture inputted with the touch pen 200 stronger than 'c' 321 of FIG. 3B and thus maintaining the pressure level sensed by the electronic device 100 as greater than 'S level' 315. If the electronic device 100 senses that the strong handwriting pressure input range 329 has a pressure level greater than 'S level' 315 and is maintained during a motion of drawing from 'a' 501 to 'b' and from 'b' to 'c' 505 with the touch pen 200, the electronic device 100 can display a straight line from 'a' 501 to 'c' 505.

According to one example embodiment, the electronic device 100 can sense a motion of getting the touch pen 200 in contact with 'a' 501. If a handwriting pressure of a gesture inputted with the touch pen 200 is stronger than 'c' 321, the electronic device 100 can sense a pressure level stronger than 'S level' 315. If the pressure level is sensed as greater than 'S level' 315, the electronic device 100 can set the straight line mode. The electronic device 100 can detect the drawing input from 'a' 501 to 'b' with the touch pen 200. The electronic device 100 can sense the drawing motion performed by the touch pen 200. In performing the crop motion on the touchscreen 133, after inputting a gesture with maintaining a pressure level greater than or equal to 'S level' 315 up to 'b', if the handwriting pressure is detected such that the pressure is weaker than 'b' 319 of FIG. 3B at point 'b' of FIG. 5A, the electronic device 100 can change the mode from the straight line mode to the curved line mode, and display a path drawn from 'a' 501 to 'b' until before change with a straight line. Continuously, if changing the handwriting pressure of the gesture inputted with the touch pen 200 stronger than 'c' 321 of FIG. 3B at 'b' of FIG. 5A and perform a motion of drawing from 'b' of FIG. 3B to 'c' 505, the electronic device 100 can change the mode from the curved line mode to the straight line mode, and display a path drawn from 'b' to 'c point' 505 after the change with a straight line.

The electronic device 100 can display on the touchscreen 133 an indicator 507 capable of confirming a handwriting pressure of a gesture inputted with the touch pen 200. Through the indicator 507, the electronic device 100 can confirm the handwriting pressure of the input gesture or a mode corresponding to the handwriting pressure.

Figure 5B:
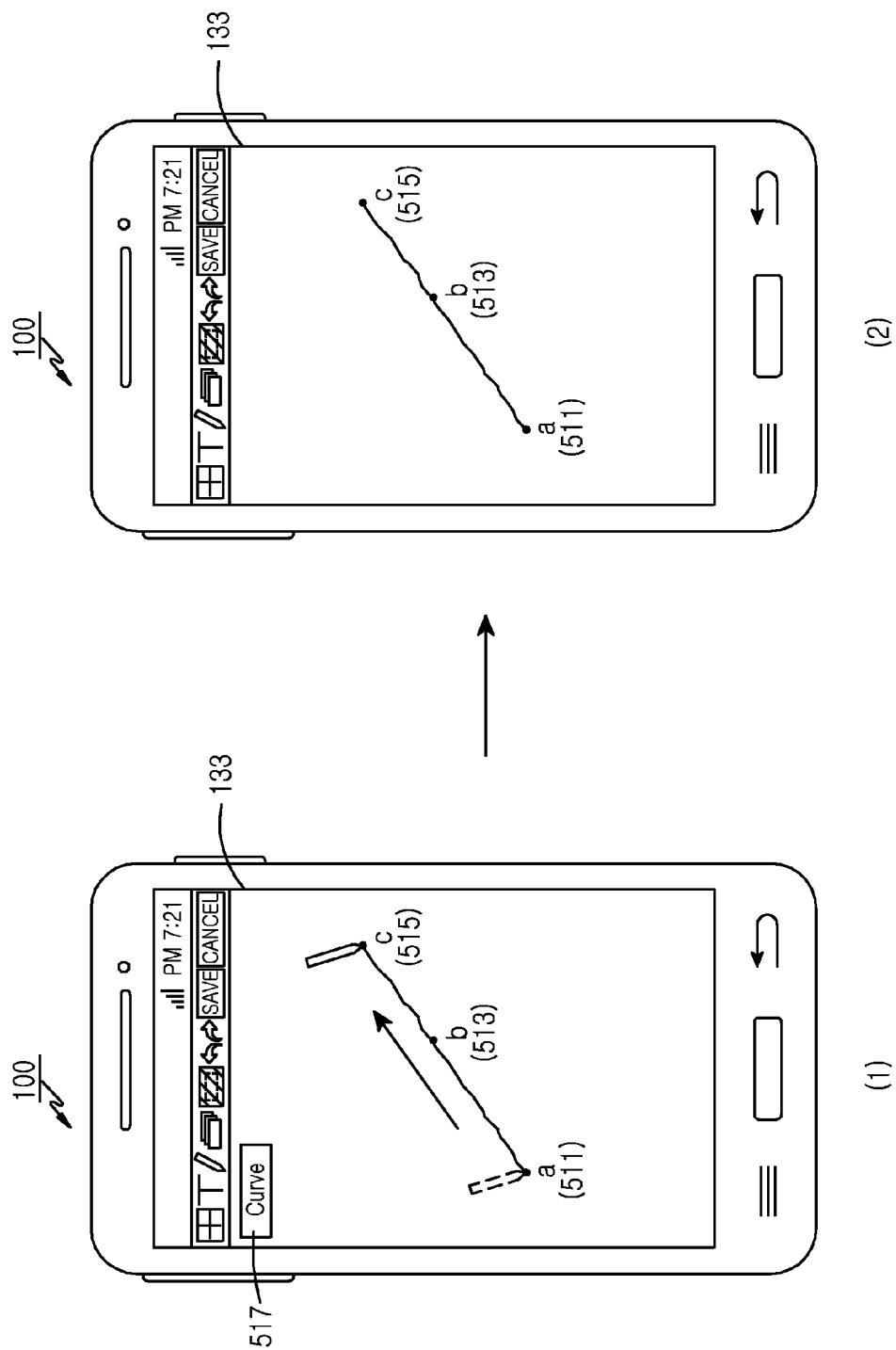

Referring now to FIG. 5B, in performing an operation according to the determined mode, the electronic device 100 can adjust the handwriting pressure of the gesture, and hold the determined mode during the operation.

Various example embodiments can be described with reference to FIG. 3B. The electronic device 100 can define a pressure level corresponding to a weak handwriting pressure as a pressure level range of 'M level' 311 to 'C level'

313 of FIG. 3B. The electronic device 100 can define a mode corresponding to the weak handwriting pressure as a curved line mode. When inputting a gesture at a handwriting pressure weaker than 'b' 319 of FIG. 3B, the electronic device 100 can set a curved line mode corresponding to a pressure level less than 'C level' 313. In performing an operation of a crop function through the curved line mode, the electronic device 100 can include minor variations in the input, such as shaking or directional changes on the touch pen 200 inputs, thereby drawing a curved line.

According to one example embodiment, the electronic device 100 can determine a mode according to handwriting pressure and draw a straight line from 'a' 511 to 'c' 515 on the touchscreen 133. The electronic device 100 can sense a contact the touch pen 200 with 'a' 511. If the corresponding handwriting pressure is weaker than 'b' 319, the electronic device 100 can detect a pressure level less than 'C level' 313. In response, the electronic device 100 can set a curved line mode for a crop operation. The electronic device 100 can receive an input of drawing from point 'a' 511 to 'c' 515 with the touch pen 200. When sensing that a pressure level of the is within a range of 'M level' 311 to 'C level' 313 of FIG. 3B (corresponding to the weak handwriting pressure input range 325) while drawing a path from 'a' 511 to 'c' 515, the electronic device 100 can include minor variations in the drawing path, such as shaking or directional changes, and draw a curved line along the path of the input gesture from 'a' 511 to 'c' 515.

According to one example embodiment, the electronic device 100 can sense contact between the touch pen 200 and point 'a' 511. If the handwriting pressure is weaker than 'b' 319 of FIG. 3B, the electronic device 100 may detect a pressure level weaker than 'C level' 313. In response, the electronic device 100 can set the curved line mode for the crop operation. The electronic device 100 may detect a gestural input from 'a' 511 to 'b' 513 with the touch pen 200 performed by the touch pen 200, wherein the pressure level range of 'M' level 311 to 'C level' 313 is maintained. This pressure range corresponds to the weak handwriting pressure input range 325 up to 'b' 513 of FIG. 3. If the handwriting pressure of the gesture increases to 'c' 321 of FIG. 3B at point 'b' 513 of FIG. 5B, the electronic device 100 can change the mode from the curved line mode to the straight line mode, and display a path drawn from 'a' 511 to 'b' 513, which until then, had reflected the curved line mode input gesture. This process may be continuous. For example, following from the previous example, if changing the handwriting pressure of the gesture inputted with the touch pen 200 to be stronger than 'c' 321 of FIG. 3B at point 'b' 513, and continuing to draw from 'b' 513 to 'c' 515, the electronic device 100 may again change the mode to the straight line mode, and can display a path drawn from 'b' 513 to 'c' 515 with a straight line.

The electronic device 100 can display on the touchscreen 133 an indicator 517 capable of confirming a handwriting pressure of a gesture inputted with the touch pen 200. Through the indicator 517, the electronic device 100 can confirm the handwriting pressure of the input gesture or a mode corresponding to the handwriting pressure.

Figure 5C:
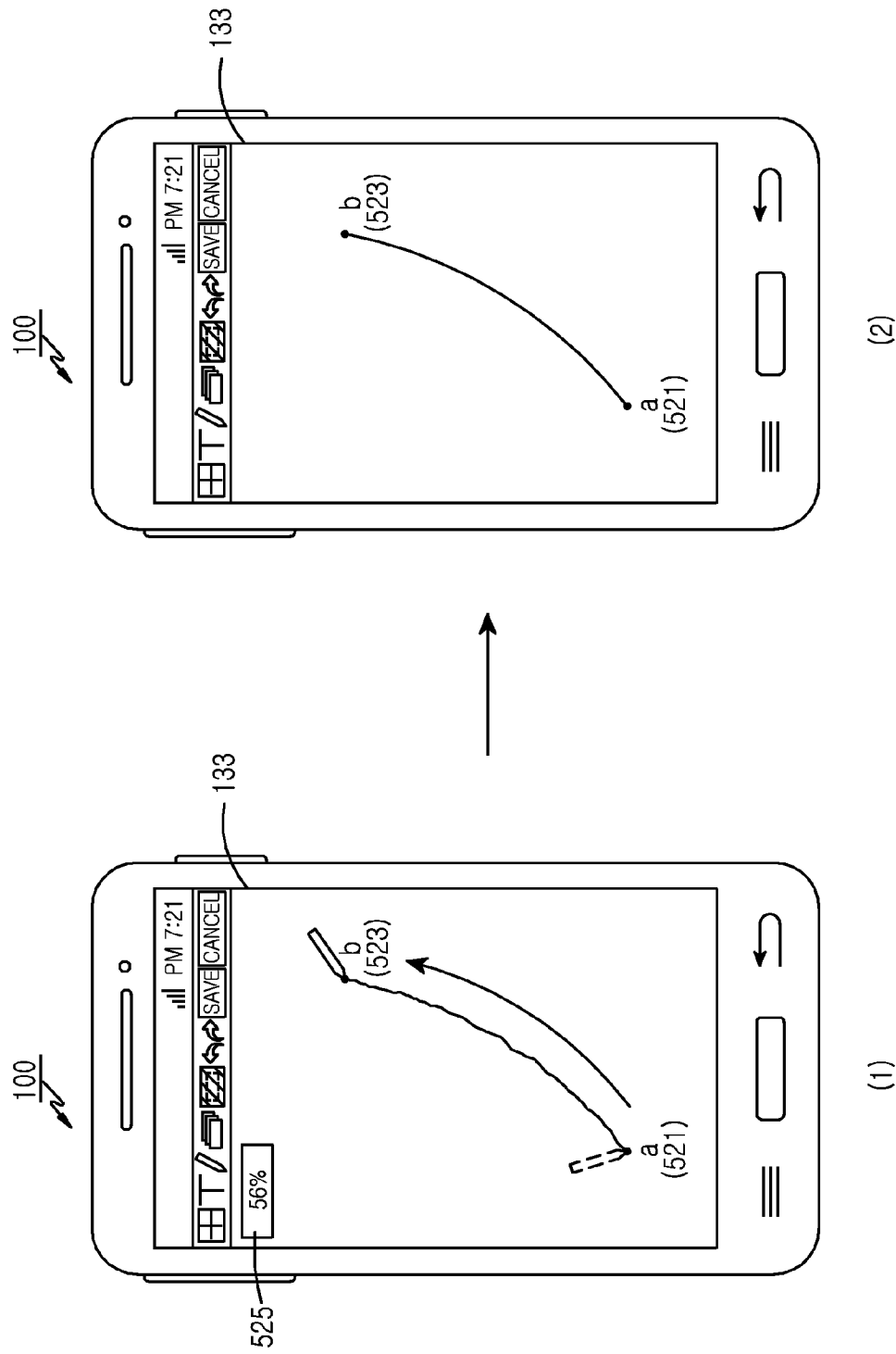

Referring now to FIG. 5C, the electronic device 100 can automatically determine a mode according to a pressure level corresponding to a handwriting pressure of a gesture inputted to the touchscreen 133 with the touch pen 200. In performing an operation according to the determined mode, the electronic device 100 can adjust the handwriting pressure of the gesture inputted to the touchscreen 133 and hold the determined mode during the operation.

Various example embodiments can be described with reference to FIG. 3B. In describing FIG. 5C, the electronic device 100 can define as a corrected path range 327 instead of the mode hold range 327 a pressure level range of 'C level' 313 to 'S level' 315 sensed by the electronic device 100, and can define as a corrected path mode a mode corresponding to the corrected path range.

The electronic device 100 can define 'C level' 313 to 'S level' 315 as a pressure level corresponding to a middle handwriting pressure, and can define a mode corresponding to the middle handwriting pressure as the corrected path mode. When inputting a gesture at a handwriting pressure stronger than 'b value' 319 and weaker than 'c value' 321 to the touchscreen 133 with the touch pen 200, the electronic device 100 can determine the corrected path mode corresponding to the pressure level greater than 'C level' 313 and less than 'S level' 315. In performing an operation of a crop function in the corrected path mode, although sensing shaking or sudden direction change forming an angular point from a gesture inputted with the touch pen 200, the electronic device 100 can draw a corrected straight line or a corrected curved line in a correction method stored in the memory 110 of the electronic device 100, without applying the shaking or sudden direction change to the corrected straight line or corrected curved line.

According to one example embodiment, the electronic device 100 can determine a mode according to a handwriting pressure and draw a straight line or curved line from 'a point' 521 to 'b point' 523 on the touchscreen 133. The electronic device 100 can sense a motion of getting the touch pen 200 in contact with 'a point' 521. If a handwriting pressure of a gesture inputted with the touch pen 200 is stronger than 'b value' 319 and weaker than 'c value' 321, the electronic device 100 can sense a pressure level greater than 'C level' 313 and less than 'S level' 315. If sensing the pressure level greater than 'C level' 313 and less than 'S level' 315, the electronic device 100 can determine as a corrected path mode a mode of the gesture inputted with the touch pen 200 in a crop motion. The electronic device 100 can perform a motion of drawing from point 'a' 521 to 'b' 523 with the touch pen 200. When sensing that the pressure level of the gesture is within a pressure level range of 'C level' 313 to 'S level' 315 of FIG. 3B, corresponding to the middle handwriting pressure input range 327 of FIG. 3B, while drawing from points 'a' 521 to 'b' 523, regardless of any variances input included shaking, sudden directional changes, or forming an angular point, the electronic device 100 can draw a corrected straight line or a corrected curved line along a path of the input gesture from points 'a' 521 to 'b' 523, without including input variances from shaking, sudden directional changes or forming the angular point to the corrected straight line or corrected curved line.

The electronic device 100 can display on the touchscreen 133 an indicator 525 capable of confirming a handwriting pressure of a gesture inputted with the touch pen 200. Through the indicator 525, the electronic device 100 can confirm the handwriting pressure of the input gesture by a percentage (%).

Figure 5D:
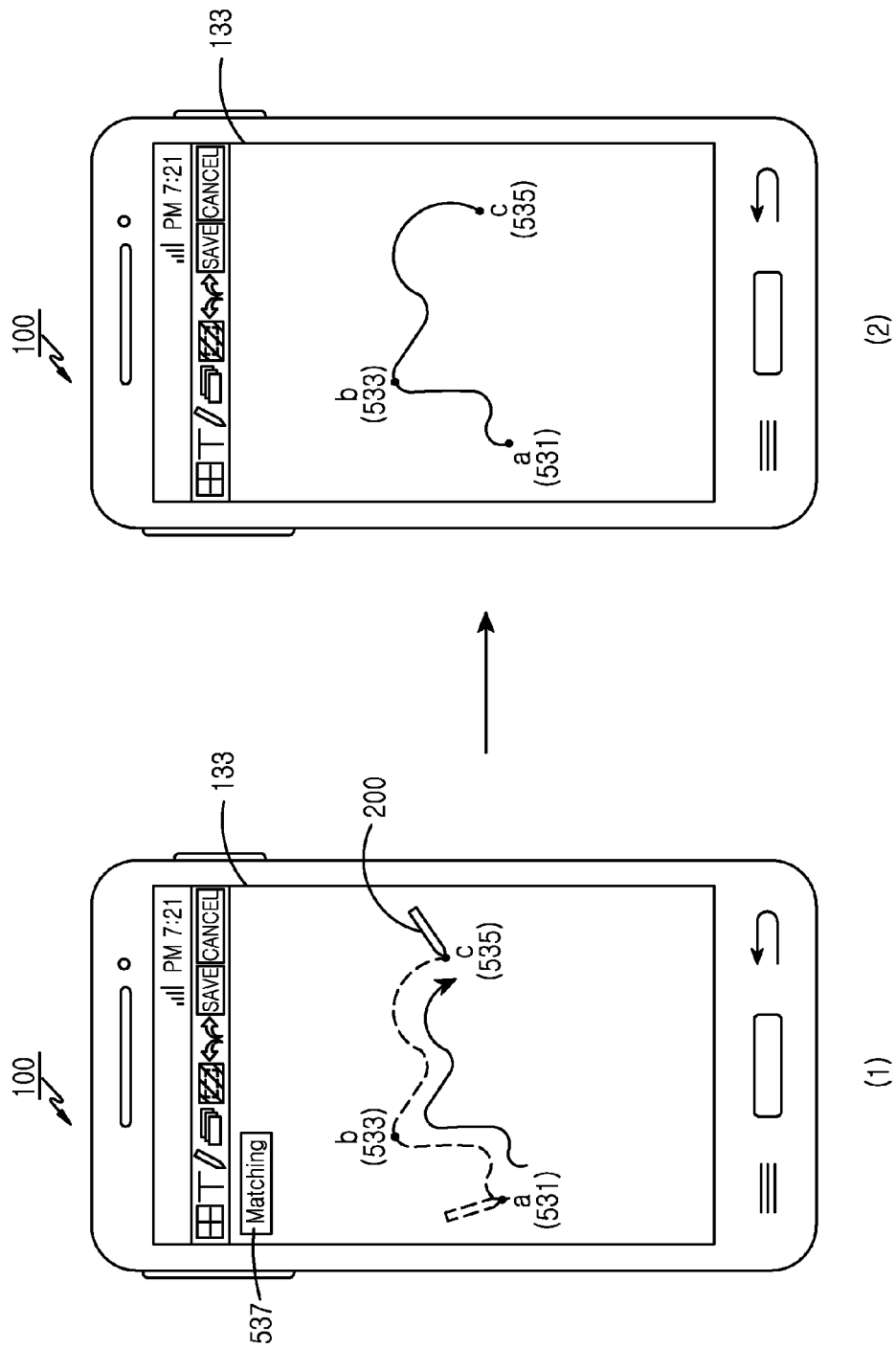

FIG. 5D is described below.

Various example embodiments can be described with reference to FIG. 3B. In describing FIG. 5D, the electronic device 100 can define as a corrected path range 327 instead of the mode hold range 327 a pressure level range of 'C level' 313 to 'S level' 315 of FIG. 3B, and can define as a corrected path mode a mode corresponding to the corrected path range.

The electronic device 100 can define 'C level' 313 to 'S level' 315 of FIG. 3B as a pressure level corresponding to a middle handwriting pressure, and can define a mode corresponding to the middle handwriting pressure as the corrected path mode. When inputting a gesture at a handwriting pressure stronger than 'b' 319 and weaker than 'c' 321 of FIG. 3B to the touchscreen 133 with the touch pen 200, the electronic device 100 can set the corrected path mode. In performing a crop function in the corrected path mode, the electronic device 100 can compare a drawn path and an image displayed on the touchscreen 133, and can correct the drawn path according to a correction method stored in the memory 110 of the electronic device 100.

According to one example embodiment, the electronic device 100 can determine a mode based on handwriting pressure, and draw a straight line or curved line from a point 'a' 531 to 'c' 535 on the touchscreen 133. When drawing a path along a line of a predetermined region displayed on the touchscreen 133 of the electronic device 100, the electronic device 100 can sense a motion of getting the touch pen 200 in contact with point 'a' 531. If a handwriting pressure of a gesture inputted with the touch pen 200 is stronger than 'b' 319 and weaker than 'c' 321 of FIG. 3B, the electronic device 100 can sense a pressure level greater than 'C level' 313 and less than 'S level' 315. In response, the electronic device 100 can set the corrected path mode a mode for a crop function. The electronic device 100 then detects a gestural motion drawing from point 'a' 531 to 'c' 535 with the touch pen 200, and the electronic device 100 can sense the drawing motion performed by the touch pen 200. The electronic device 100 can sense that the pressure level of the input corresponds to 'C level' 313 to 'S level' 315 of FIG. 3B while drawing a path from points 'a' 531 to 'c' 535. The electronic device 100 can compare the path drawn from point 'a' 531 to 'c' 535 with a predetermined image region corresponding to the drawn path among an image displayed on the touchscreen 133, and can correct the drawn path according to a correction method stored in the memory 110 of the electronic device 100.

According to one example embodiment, the electronic device 100 can sense a motion of getting the touch pen 200 in contact with point 'a' 531. If the handwriting pressure of the gesture inputted with the touch pen 200 is stronger than 'b' 319 and weaker than 'c value' 321 of FIG. 3B, the electronic device 100 can sense the pressure level greater than 'C level' 313 and less than 'S level' 315. In response, the electronic device 100 can set the corrected path for a current crop motion. The electronic device 100 can display a drawing from points 'a' 531 to 'b' 533 with the touch pen 200, and the electronic device 100 can sense the drawing motion performed by the touch pen 200. If pressure is maintained at 'C level' 313 to 'S level' 315 while the drawing is made to point 'b' 533, and then the pressure decreases to 'b' 319 of FIG. 3B at point 'b' 533 of FIG. 5D, the electronic device 100 can change the mode of the gesture inputted from the corrected path mode to a curved line mode, and display a path drawn from 'a' 531 to 'b' 533 with a curved line reflecting the input gesture. If the handwriting pressure again changes to be weaker than 'b' 319 of FIG. 3B at point 'b' 533 and performing a drawing from point 'b' 533 to 'c' 535, the electronic device 100 can change the mode of from the corrected path mode to the curved line mode, and display a path drawn from 'b' 533 to 'c' 535 with a non-corrected curved line.

The electronic device 100 can display on the touchscreen 133 an indicator 537 capable of confirming a handwriting pressure of a gesture inputted with the touch pen 200.

Through the indicator 537, the electronic device 100 can confirm the handwriting pressure of the input gesture or a mode corresponding to the handwriting pressure.

The electronic device 100 is not limited to automatically changing a mode according to a handwriting pressure of an input gesture and determining a path of a crop motion, and is applicable variously to a motion having to be selected through a displayed menu so as to change a mode like a motion of drawing an image.

Figure 6A:
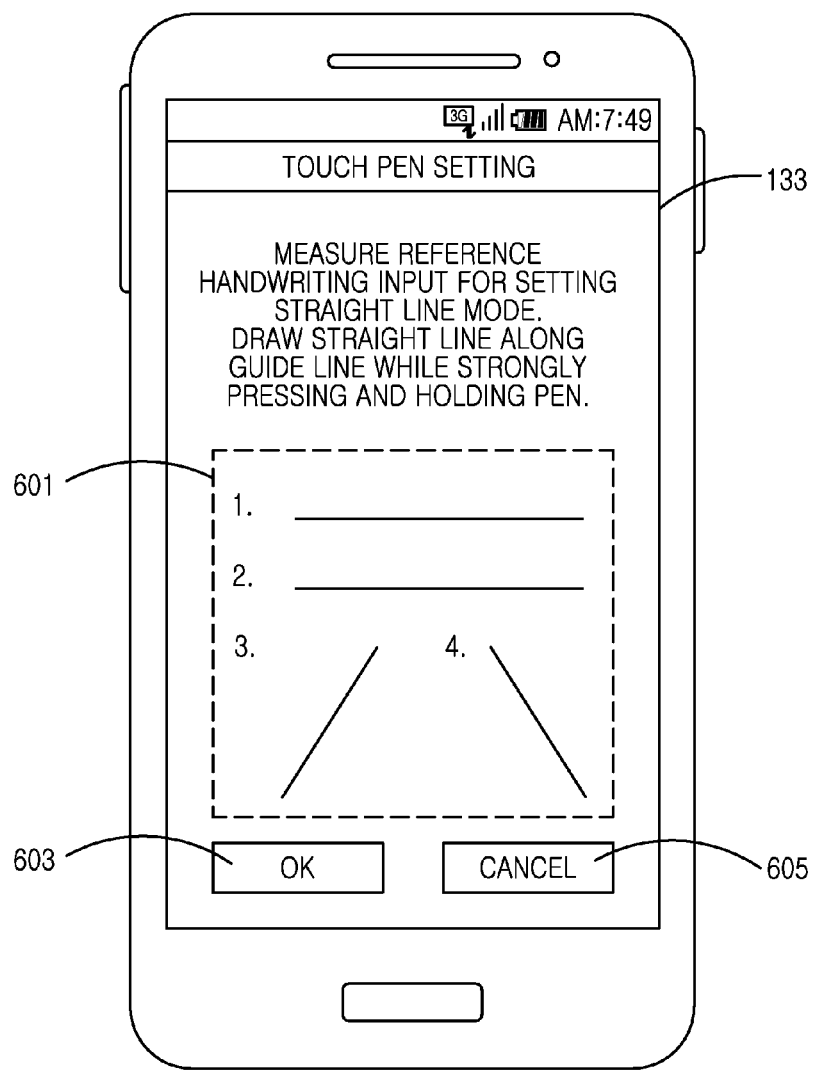
FIG. 6A and FIG. 6B are diagrams illustrating a setting operation for processing a gesture according to a handwriting pressure in an electronic device according to various example embodiments of the disclosure.
Figure 6B:
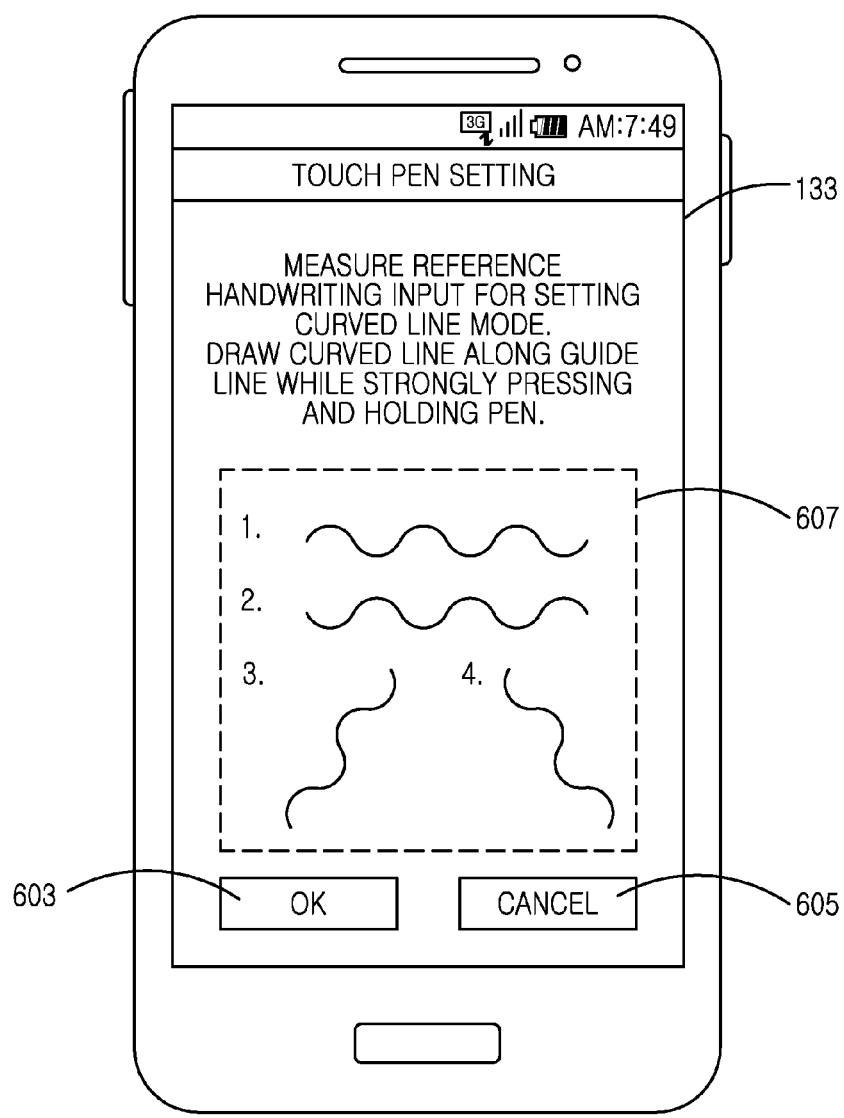

FIGS. 6A and 6B illustrate a setting operation for processing a gesture according to a handwriting pressure in an electronic device according to various example embodiments of the disclosure.

The electronic device 100 can sense a handwriting pressure of a gesture inputted with the touch pen 200 and automatically determine a mode corresponding to the handwriting pressure. The mode corresponding to the handwriting pressure can include a straight line mode and a curved line mode, and can further include other modes. The electronic device 100 can determine if the handwriting pressure of the gesture inputted through the touchscreen 133 is a handwriting pressure of drawing a straight line or a handwriting pressure of drawing a curved line.

In confirming the inputted handwriting pressure and determining the mode according to the confirmed handwriting pressure, the electronic device 100 can refer to setting information of the input processing program 116 (of FIG. 1) pre-stored in the memory 110 of the electronic device 100. The setting information pre-stored in the memory 110 of the electronic device 100 can define and include information of a pressure level corresponding to a handwriting pressure of a gesture that a user inputs in a setting step of the input processing program 116, and a mode corresponding to the pressure level. In defining the mode corresponding to the pressure level, the electronic device 100 can define one or more listed pressure levels as one pressure level range and define a mode corresponding to the one pressure level range. The memory 110 can include one or more pressure level ranges consisting of one or more listed pressure levels. In setting a pressure level or a pressure level range capable of determining a mode according to a handwriting pressure, the electronic device 100 can receive an input of a gesture for setting from the user in various methods.

With reference to a pressure level corresponding to a straight line, the electronic device 100 can determine a pressure level range capable of determining a straight line mode. With reference to a pressure level corresponding to a curved line, the electronic device 100 can determine a pressure level range capable of determining a curved line mode. Between the pressure level range capable of determining the straight line mode and the pressure level range capable of determining the curved line mode, the electronic device 100 may determine a pressure level range capable of determining another mode.

Referring now to FIG. 6A, the electronic device 100 can provide a menu capable of facilitating a user gesture input drawing a straight line on the touchscreen 133, and determine a handwriting pressure of the gesture.

Referring to FIG. 6A, the electronic device 100 can refer to a reference pressure level to determine a pressure level range corresponding to a straight line mode. The electronic device 100 can provide a user with a guide menu 601 for inputting a gesture for defining the reference pressure level. The electronic device 100 can receive various gestures of drawing one or more straight lines through the guide menu 601 displayed on the touchscreen 133. After inputting the gesture, the electronic device 100 can select an "OK" icon 603 and set the gesture input, or can select a "cancel" icon 605 and cancel the gesture input.

The electronic device 100 can determine the reference pressure level for the straight line mode through input gestures. The electronic device 100 can define the reference pressure level for the straight line mode in a method of averaging handwriting pressures of the input gestures. The electronic device 100 can define a predetermined range based on the determined reference pressure level, as the pressure level range corresponding to the straight line mode.

Referring now to FIG. 6B, the electronic device 100 can provide a menu capable of inputting a user's gesture of drawing a curved line through the touchscreen 133, and can determine a handwriting pressure of a gesture that a user inputs to draw the curved line.

Referring to FIG. 6B, the electronic device 100 can refer to a reference pressure level to determine a pressure level range corresponding to a curved line mode. The electronic device 100 can provide a user with a guide menu 607 for inputting a gesture for defining a pressure level. The electronic device 100 can receive various gestures of drawing one or more curved lines through the guide menu 607 displayed on the touchscreen 133. After inputting the gesture, the electronic device 100 can select the "OK" icon 603 and set the gesture input, or can select the "cancel" icon 605 and cancel the gesture input.

The electronic device 100 can determine the reference pressure level for the curved line mode through input gestures. The electronic device 100 can define the reference pressure level for the curved line mode in a method of averaging handwriting pressures of the input gestures. The electronic device 100 can define a predetermined range based on the determined reference pressure level, as the pressure level range corresponding to the curved line mode.

Figure 7:
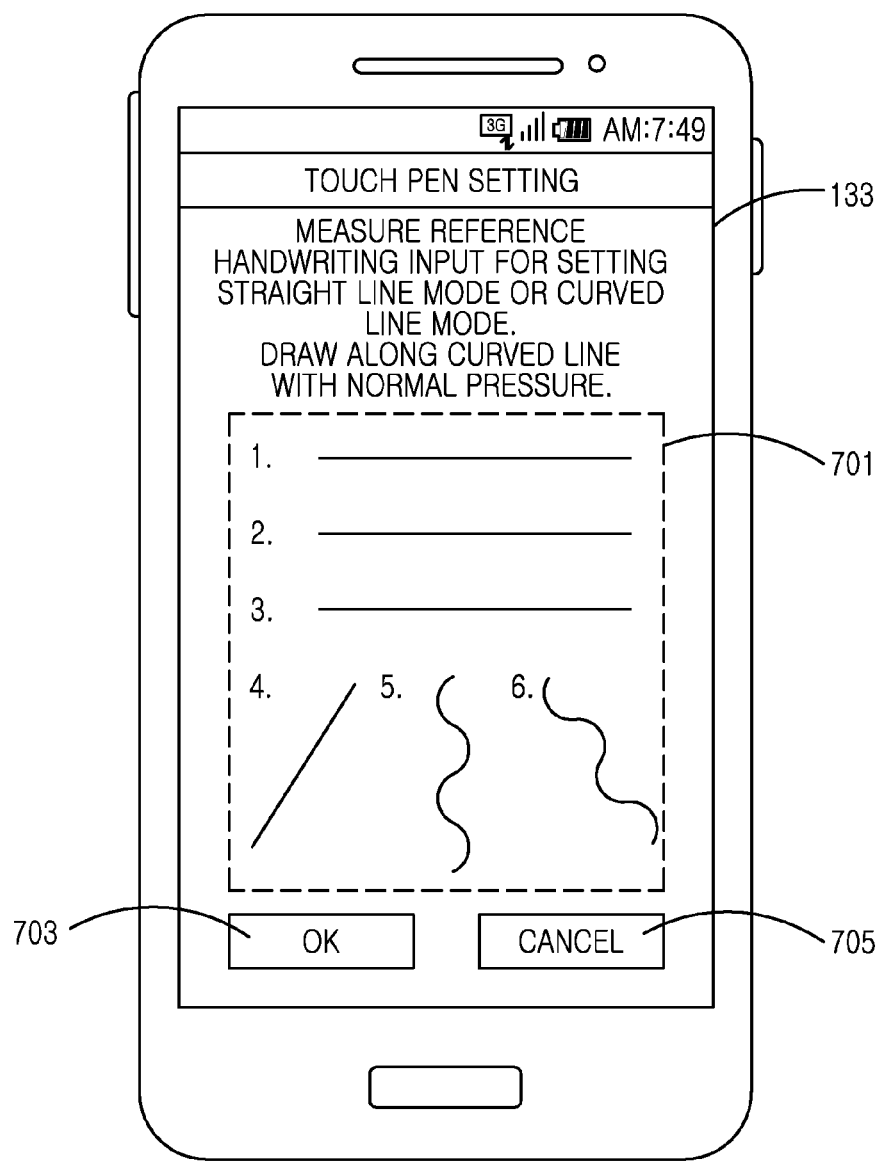
FIG. 7 is a diagram illustrating a setting operation for processing a gesture according to a handwriting pressure in an electronic device according to various example embodiments of the disclosure.

FIG. 7 illustrates a setting operation for processing a gesture according to a handwriting pressure in an electronic device according to various example embodiments of the disclosure.

The electronic device 100 can sense a handwriting pressure of a gesture inputted with the touch pen 200 and automatically determine a mode corresponding to the handwriting pressure. The mode corresponding to the handwriting pressure can include a straight line mode and a curved line mode. The electronic device 100 can determine if the handwriting pressure of the gesture inputted through the touchscreen 133 is a handwriting pressure of drawing a straight line or a handwriting pressure of drawing a curved line.

Referring to FIG. 7, the electronic device 100 can provide a menu 701 for inputting the user's gesture of drawing the straight line and the curved line through the touchscreen 133, and can determine a handwriting pressure of a gesture that a user inputs to draw the straight line and the curved line.

The electronic device 100 can determine a reference pressure level for differentiating between a straight line mode and a curved line mode. The electronic device 100 can provide a user with a guide menu 701 for inputting a gesture for defining a pressure level. The electronic device 100 can receive various gestures drawing one or more straight lines and curved lines through the guide menu 701 displayed on the touchscreen 133. After inputting the gesture, the electronic device 100 can select an "OK" icon 703 and the gesture input, or a "cancel" icon 705 and cancel the gesture input.

The electronic device 100 can perform an operation for determining the reference pressure level for dividing the straight line mode and the curved line mode through input gestures. The electronic device 100 can distinguish the input gesture into a straight line and a curved line. Through handwriting pressures of the straight line gesture and curved line gesture, the electronic device 100 can obtain an average pressure level corresponding to a straight line input and an average pressure level corresponding to a curved line input. The electronic device 100 can determine an average value of both the average pressure level corresponding to the straight line input and the average pressure level corresponding to the curved line input, as the reference pressure level for distinguishing the straight line mode and the curved line mode.

Figure 8:
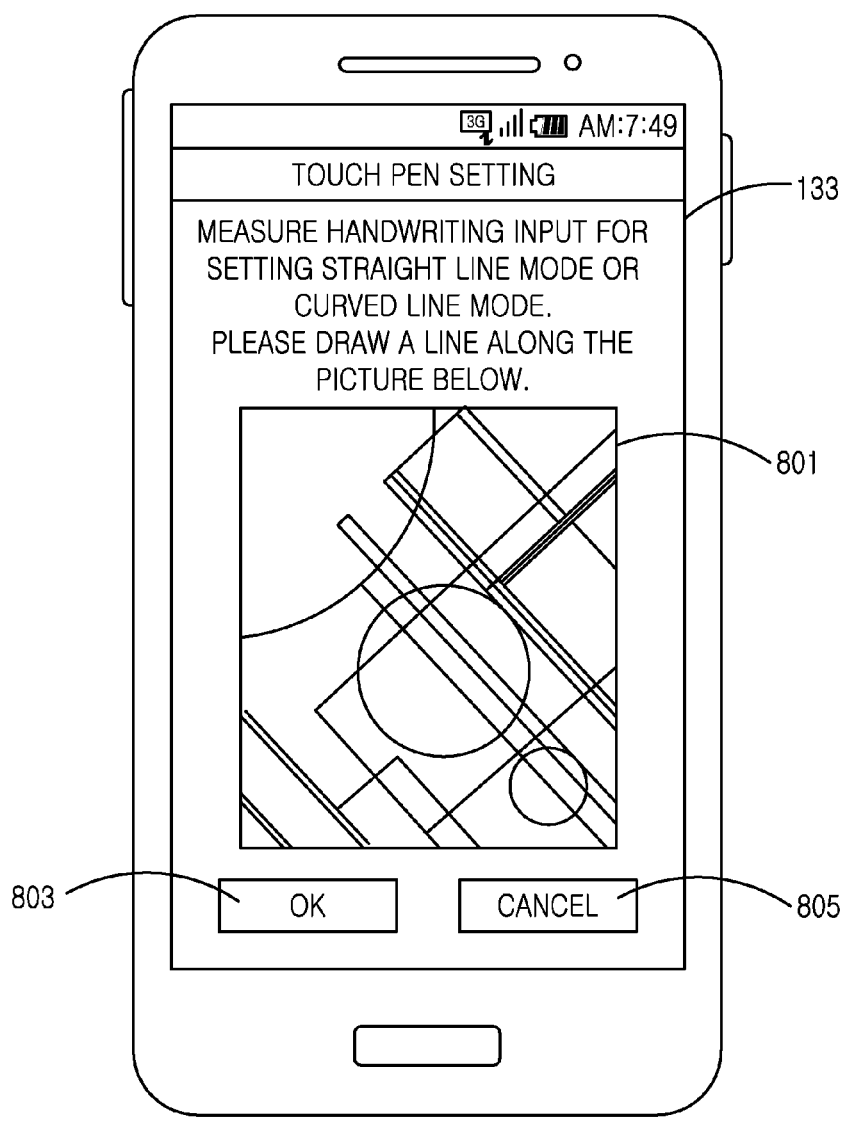
FIG. 8 is a diagram illustrating a setting operation for processing a gesture according to a handwriting pressure in an electronic device according to various example embodiments of the disclosure.

FIG. 8 illustrates a setting operation for processing a gesture according to a handwriting pressure in an electronic device according to various example embodiments of the disclosure.

The electronic device 100 can sense a handwriting pressure of a gesture input with the touch pen 200 and automatically determine a mode corresponding to the handwriting pressure. The mode corresponding to the handwriting pressure can include a straight line mode and a curved line mode. The electronic device 100 can determine if the handwriting pressure of the gesture inputted through the touchscreen 133 is a handwriting pressure of drawing a straight line or a handwriting pressure of drawing a curved line.

The electronic device 100 can provide an image 801 capable of inputting the user's gesture of drawing the straight line and the curved line through the touchscreen 133, and can determine a handwriting pressure of a gesture that a user inputs to draw the straight line and the curved line.

The electronic device 100 can determine a reference pressure level for differentiating between a straight line mode and a curved line mode. The electronic device 100 can provide a user with the image 801 for inputting a gesture for defining the reference pressure level. By providing the image 801 displayed on the touchscreen 133 to draw along the image 801, the electronic device 100 can receive various gestures of drawing one or more straight lines and curved lines. After inputting the gesture, the electronic device 100 can select an "OK" icon 803 and determine the gesture input, or can select a "cancel" icon 805 and cancel the gesture input.

According to one example embodiment, the electronic device 100 can perform an operation for determining the reference pressure level for distinguishing the straight line mode and the curved line mode through input gestures. The electronic device 100 can distinguish the input gesture into a straight line and a curved line. Through handwriting pressures of the straight line gesture and the curved line gesture, the electronic device 100 can obtain an average pressure level corresponding to a straight line input and an average pressure level corresponding to a curved line input. The electronic device 100 can determine an average value of both the average pressure level corresponding to the straight line input and the average pressure level corresponding to the curved line input, as the reference pressure level for distinguishing the straight line mode and the curved line mode.

According to one example embodiment, as described with reference to FIGS. 6A and 6B, the electronic device 100 can determine a pressure level range for a straight line mode and a pressure level range for a curved line mode. The electronic device 100 is not limited to the pressure level range for the straight line mode and the pressure level range for the curved line mode, and can determine one or more pressure level ranges and further include other modes corresponding to the pressure level ranges.

Figure 9:
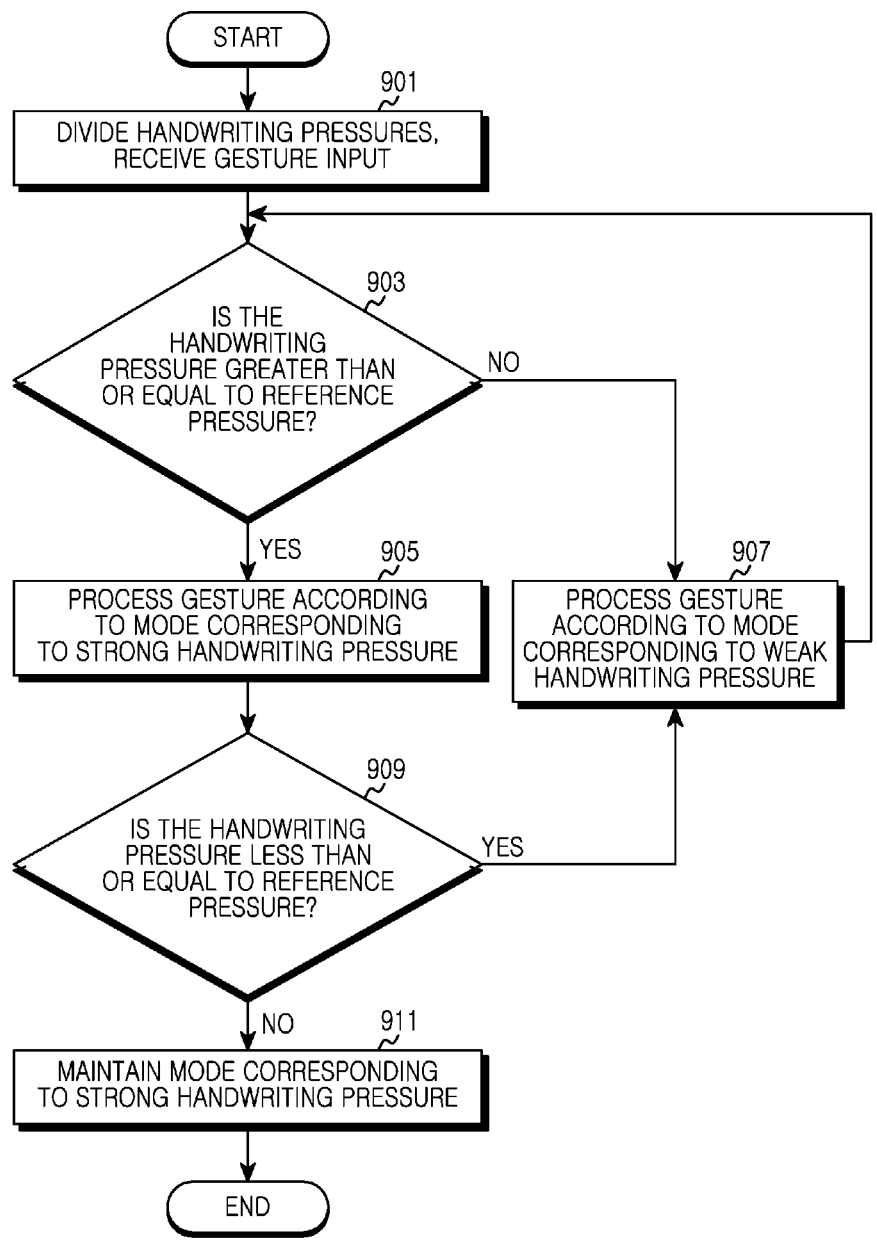
FIG. 9 is a flowchart illustrating a procedure of processing a gesture according to a handwriting pressure in an electronic device according to various example embodiments of the disclosure.

FIG. 9 illustrates a procedure of processing a gesture according to a handwriting pressure in an electronic device according to various example embodiments of the disclosure.

In operation 901, the electronic device 100 can detect a handwriting pressure of a gesture received through the touchscreen 133. As described in FIGS. 3A to 3D, the electronic device 100 can detect a handwriting pressure of the gesture inputted with the input means received through the touchscreen 133.

In operation 903, the electronic device 100 can sense a pressure level corresponding to the handwriting pressure of the input gesture. The electronic device 100 can confirm a mode corresponding to the handwriting pressure of the input gesture through information stored in the memory 110 and set the mode according to the handwriting pressure.

According to one example embodiment, referring to FIG. 3C, the electronic device 100 may associate a straight line mode with a strong handwriting pressure, and associate as a curved line mode with a weak handwriting pressure. If a pressure level is within the strong handwriting pressure input range 331, the electronic device 100 can set as the straight line mode in operation 905. If the pressure level corresponding to the handwriting pressure of the input gesture is in the weak handwriting pressure input range 333, the electronic device 100 can set the curved line mode in operation 907.

In operation 905, the electronic device 100 can process the input gesture according to the straight line mode. In a motion of inputting a gesture with the input means and drawing a straight line, even if variations input such as shaking, directional changes or forming an angular point, the electronic device 100 can display a straight line according to a processing method in the straight line mode, without displaying or including inputs generated by the shaking, the change of the direction, or forming the angular point.

In operation 907, the electronic device 100 can process the input gesture according to the curved line mode. In this mode, while drawing a curved line, even if variations in inputs, such as shaking, directional changes, or forming an angular point, the electronic device 100 applies and displays the curved line according to a processing method predefined in the curved line mode, without applying the shaking directional changes, or forming the angular point. After operation 907, the electronic device 100 returns to operation 903.

After operation 905, the electronic device 100 performs operation 909. In operation 909, to change the mode of the input gesture, the electronic device 100 can sense a variation of the handwriting pressure of the input gesture. While the electronic device 100 processes the input gesture according to the straight line mode (referring to operation 905), the electronic device 100 can determine if the handwriting pressure of the input gesture is changed and included in the weak handwriting pressure input range 333.

If the changed handwriting pressure of the gesture is included in the weak handwriting pressure input range 333, the electronic device 100 can perform operation 907 starting from that time point. If the changed handwriting pressure of the gesture is not included in the weak handwriting pressure input range 333, the electronic device 100 can perform operation 911.

While inputting the gesture to the touchscreen 133 with the input means, in operation 911, the electronic device 100 can sense the variation of the handwriting pressure of the input gesture. The electronic device 100 can sense that the handwriting pressure of the input gesture is changed out of the strong handwriting pressure input range 331. Although the handwriting pressure of the input gesture is changed out of the strong handwriting pressure input range 331, if the handwriting pressure is not included in the weak handwriting pressure input range 333, the electronic device 100 can maintain the straight line mode. In setting information for processing a gesture according to a pressure level corresponding to a handwriting pressure set to the memory 110, if defining other modes corresponding to handwriting pressure input ranges other than the strong handwriting pressure input range 331 or the weak handwriting pressure input range 333, the electronic device 100 can process a gesture in other modes besides the strong handwriting pressure input range 331, or the weak handwriting pressure input range 333, according to the setting information.

After operation 911, when sensing a cancellation of the gesture input, the electronic device 100 can terminate the procedure of FIG. 9.

Various example embodiments of the disclosure can provide a User eXperience (UX) capable of removing an inconvenience of selecting a menu displayed on the touchscreen so as to select a desired mode when inputting a gesture to the electronic device 100 with the input means. Various example embodiments of the disclosure can provide to keep a continuity of a gesture input by removing an inconvenience of selecting the menu so as to change a mode.

Various example embodiments of the disclosure can be performed through one or more programs included in the memory 110 of the electronic device 100, and may be controlled directly by a processor.

Methods according to example embodiments disclosed in claims and/or specification of the disclosure can be implemented in a form of hardware, software, or a combination of hardware and software.

In a case where the methods are implemented via the execution of software and computer code, a computer readable storage medium storing one or more programs (i.e., software modules) can be provided. The one or more programs stored in the computer readable storage medium are configured to be executable by one or more processors within an electronic device 100. The one or more programs can include instructions for enabling the electronic device 100 to execute the methods according to the example embodiments disclosed in the claims and/or specification of the disclosure.

These programs (i.e., software modules or software) can be stored in a Random Access Memory (RAM), a nonvolatile memory including a flash memory, a Read Only Memory (ROM), an Electrically Erasable Programmable ROM (EEPROM), a magnetic disk storage device, a Compact Disk ROM (CD-ROM), a Digital Versatile Disk (DVD) or an optical storage device of other form, and a magnetic cassette. Or, the programs can be stored in a memory configured by a combination of some or all of them. Also, each configuration memory may be included in plural number.

Also, the programs can be stored in an attachable storage device accessible to the electronic device through a communication network such as the Internet, an intranet, a Local Area Network (LAN), a Wireless LAN (WLAN) and a Storage Area Network (SAN) or a communication network configured by a combination of them. This storage device can access the electronic device 100 through an external port.

Also, a separate storage device on a communication network may access the portable electronic device 100.

While the disclosure has been shown and described with reference to certain optional embodiments thereof, it will be understood by those skilled in the art that various changes in form and details may be made therein without departing from the ambit of the disclosure as defined by the appended claims.

What is claimed is:

1. A method in an electronic device, the method comprising:
    displaying a guide line for measuring reference pressure level;
    receiving a touch input along the guide line by using a touch pen;
    detecting pressure of the touch input;
    determining the reference pressure level based on the detected pressure of the touch input;
    detecting pressure of a touch gesture in response to detecting the touch gesture by the touch pen;
    setting a line mode based on the pressure of the touch gesture;
    drawing a line according to a path of the touch gesture in the line mode;
    determining whether the pressure of the touch gesture is changed;
    determining whether the changed pressure of the touch gesture satisfies the reference pressure level, when the pressure of the touch gesture is changed;
    changing the line mode, when the changed pressure of the touch gesture satisfies the reference pressure level; and
    maintaining the line mode, when the changed pressure of the touch gesture does not satisfy the reference pressure level.

2. The method of claim 1, wherein setting the line mode comprises setting a straight line mode of a crop function, when the pressure of the touch gesture is greater than a first pressure level; and
    drawing a straight line for cropping according to the path of the touch gesture.

3. The method of claim 1, wherein setting the line mode comprises setting a curved line mode of a crop function, when the pressure of the touch gesture is less than or equal to a second pressure level; and
    drawing a curved line for cropping according to the path of the touch gesture.

4. The method of claim 1, wherein changing the line mode comprises when the changed pressure of the touch gesture is greater than a first pressure level or less than or equal to a second pressure level, changing the line mode based on the changed pressure of the touch gesture.

5. The method of claim 1, wherein maintaining the line mode comprises when the changed pressure of the touch gesture is less than or equal to a first pressure level and greater than a second pressure level, maintaining the line mode.

6. The method of claim 1, further comprising:
    displaying an indicator capable of confirming the pressure of the touch gesture inputted with the touch pen on a touch screen of the electronic device.

7. The method of claim 1, wherein determining whether the pressure of the touch gesture is changed comprises determining the pressure of the touch gesture is changed, when an angle change of the line is greater than a reference threshold.

8. The method of claim 1, wherein determining whether the pressure of the touch gesture is changed comprises determining the pressure of the touch gesture is changed, while the touch gesture is maintained.

9. An electronic device, comprising:
    a touch screen; and
    a controller configured to:
        control to display a guide line for measuring reference pressure level;
        receive a touch input along the guide line by using a touch pen;
    detect a pressure of the touch input:
        determine the reference pressure level based on the detected pressure of the touch input;
        detect a pressure of a touch gesture in response to detecting the touch gesture by the touch pen;
        set a line mode based on the pressure of the touch gesture;
        control to draw a line according to a path of the touch gesture in the line mode on the touch screen;
        determine whether the pressure of the touch gesture is changed;
        determine whether the changed pressure of the touch gesture satisfies the reference pressure level, when the pressure of the touch gesture is changed;
        change the line mode, when the changed pressure of the touch gesture satisfies the reference pressure level; and
        maintain the line mode, when the changed pressure of the touch gesture is does not satisfy the reference pressure level.

10. The electronic device of claim 9, wherein the controller is configured to:
    set a straight line mode of a crop function, when the pressure of the touch gesture is greater than a first pressure level; and
    control to draw a straight line for cropping according to the path of the touch gesture.

11. The electronic device of claim 9, wherein the controller is configured to:
    set a curved line mode of a crop function, when the pressure of the touch gesture is less than or equal to a second pressure level; and
    control to draw a curved line for cropping according to the path of the touch gesture.

12. The electronic device of claim 9, wherein the controller is configured to:
    when the changed pressure of the touch gesture is greater than a first pressure level or less than or equal to a second pressure level, change the line mode based on the changed pressure of the touch gesture.

13. The electronic device of claim 9, wherein the controller is configured to:
    when the changed pressure of the touch gesture is less than or equal to a first pressure level and greater than a second pressure level, maintain the line mode.

14. The electronic device of claim 9, wherein the controller is further configured to:
    control to display an indicator capable of confirming the pressure of the touch gesture inputted with the touch pen on the touch screen.

15. The electronic device of claim 9, wherein the controller is configured to:
    determine the pressure of the touch gesture is changed, when an angle change of the line is greater than a reference threshold.

16. The electronic device of claim 9, wherein the controller is configured to:

determine the pressure of the touch gesture is changed, while the touch gesture is maintained.

* * * * *